United States Patent
Moor et al.

(10) Patent No.: US 11,378,523 B1
(45) Date of Patent: Jul. 5, 2022

(54) IMAGING DEVICE BLEMISH DETECTION TEST ENCLOSURE

(71) Applicant: Zoox, Inc., Foster City, CA (US)

(72) Inventors: Robert Nicholas Moor, San Mateo, CA (US); Nathan Duarte, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/139,973

(22) Filed: Dec. 31, 2020

(51) Int. Cl.
  *G01N 21/94* (2006.01)
  *G01N 21/958* (2006.01)
  (Continued)

(52) U.S. Cl.
  CPC ......... *G01N 21/94* (2013.01); *G01M 11/0278* (2013.01); *G01N 21/8806* (2013.01); *G01N 21/958* (2013.01); *H04N 5/2171* (2013.01); *G01M 11/31* (2013.01); *G01N 2021/9583* (2013.01)

(58) Field of Classification Search
  CPC ......... G01M 11/0242; G01M 11/0278; G01M 11/31; H04N 5/2171; H04N 5/3572; H04N 5/367; H04N 5/3675; H04N 17/002; G01N 2021/945; G01N 2021/9511; G01N 2021/9583; G01N 21/88; G01N 21/8803; G01N 21/8806; G01N 21/892; G01N 21/8921; G01N 21/896; G01N 21/94; G01N 21/95
  See application file for complete search history.

(56) References Cited

U.S. PATENT DOCUMENTS 3,776,638 A * 12/1973 Teter .................. G01M 11/0285
  356/124
8,456,638 B2 * 6/2013 Ohkubo ................ G01J 3/0251
  356/445
(Continued)

FOREIGN PATENT DOCUMENTS

CN 202614375 U * 12/2012
CN 209086170 U * 7/2019
(Continued)

OTHER PUBLICATIONS

Office Action for U.S. Appl. No. 17/139,938, dated Feb. 14, 2022, Moor, "Imaging Device Blemish Detection Structures and Techniques", 6 pages.

*Primary Examiner* — Gordon J Stock, Jr.
(74) *Attorney, Agent, or Firm* — Lee & Hayes, P.C.

(57) ABSTRACT

An imaging device blemish detection test enclosure and techniques for an optical imaging device includes a mounting structure for mounting an optical imaging device, a first body with a concave surface, and a second body holding the mounting structure relative to the first body. The mounting structure and the second body may orient an optical axis of a lens of the optical imaging device towards the concave surface and locate the lens relative to the concave surface where the interface between the first and second bodies is outside of a lens field of view of the lens. The system may include a light source disposed in the second body and directed towards the concave surface of the of the first body providing an evenly illuminating the concave surface. The concave surface may include a surface of a spherical sector greater than a hemisphere.

20 Claims, 16 Drawing Sheets

(51) Int. Cl.
*H04N 5/217* (2011.01)
*G01N 21/88* (2006.01)
*G01M 11/02* (2006.01)
*G01M 11/00* (2006.01)

(56) References Cited

U.S. PATENT DOCUMENTS

| | | | |
|---|---|---|---|
| 8,675,987 B2* | 3/2014 | Agarwaia | G06T 5/005 |
| | | | 382/275 |
| 10,585,333 B1* | 3/2020 | Hardy | F21V 3/049 |
| 11,172,192 B2* | 11/2021 | Lu | H04N 5/2171 |
| 2008/0317380 A1* | 12/2008 | Peng | G01N 21/94 |
| | | | 382/276 |
| 2013/0148116 A1 | 6/2013 | Tanaka | |

FOREIGN PATENT DOCUMENTS

| | | | | |
|---|---|---|---|---|
| KR | 20150118073 A | * | 10/2015 | |
| KR | 20160051377 A | * | 5/2016 | |
| WO | WO-2017080441 A1 | * | 5/2017 | G03B 43/00 |

* cited by examiner

IMAGING DEVICE BLEMISH DETECTION TEST ENCLOSURE

BACKGROUND

Many systems in operation today, including vehicles, are designed to perceive their surroundings using sensors, for example, optical sensors or cameras. The sensors are often produced in clean environments, but not all contaminants or foreign objects are prevented from entering the optical sensors. In some examples, the foreign objects may cause a blemish to appear on a captured image. In some examples, the blemish is not identified before the optical sensor is integrated into the system, for example, a vehicle, and may cause erroneous data to be received and processed by the system impacting its performance. These and other issues are complicated by the number and type of sensors to be included on a vehicle. While sensor technology is improving, compact, electric, bidirectional, and/or autonomous vehicles have unique components and configurations that, under certain conditions, conventional sensor systems may be insufficient to provide data to the vehicle during operation or may cause long delays while the sensors are replaced.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
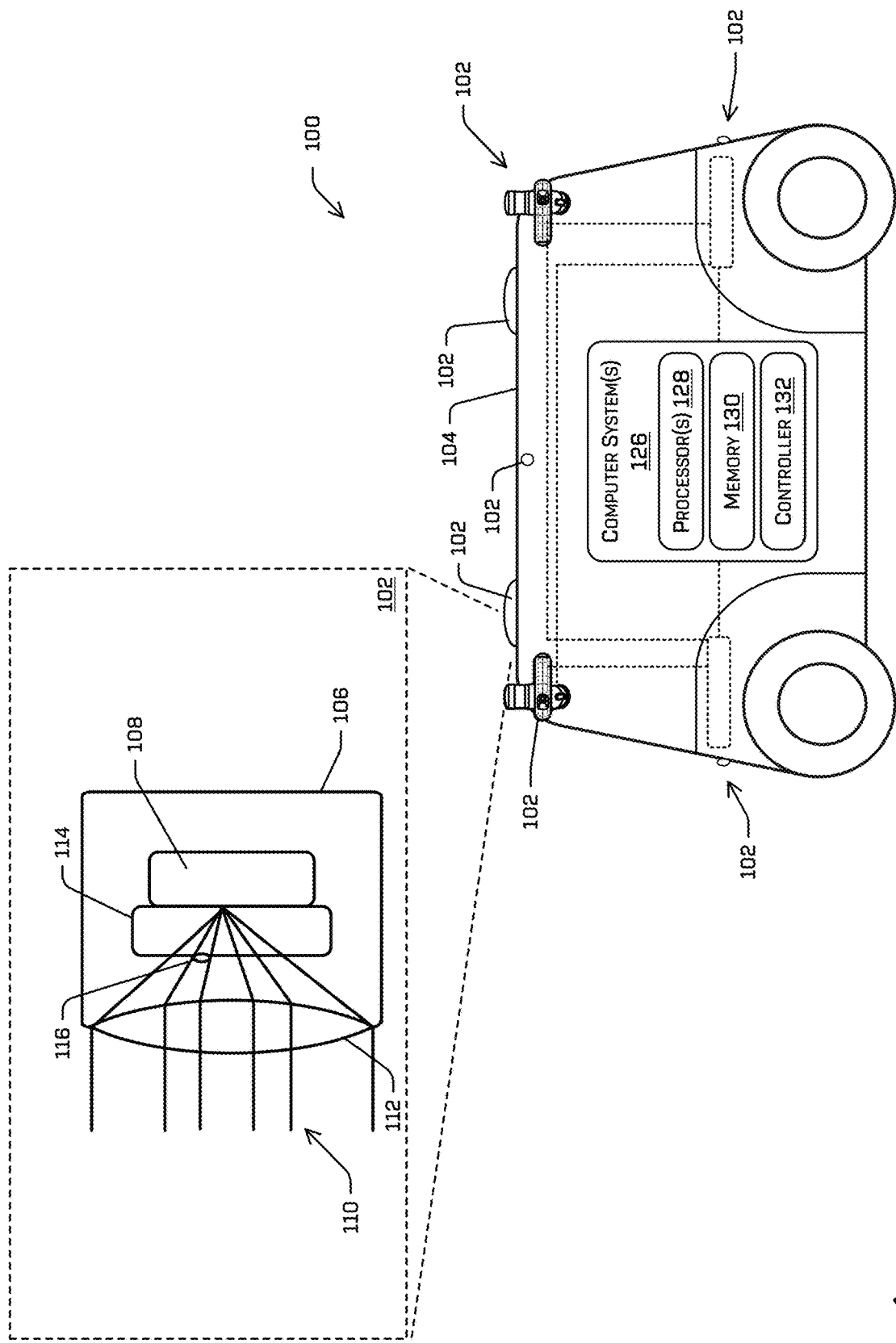
FIG. 1 is an illustration of an example vehicle having one or more sensors to collect and provide data to the autonomous vehicle, in accordance with examples of the disclosure.

As discussed above, conventional optical sensors might not be manufactured in an ideal environment allowing some contaminants to enter the sensor. In some applications, the contaminants might not cause an issue, while in other applications, the contaminants may adversely affect the data captured by the sensor and/or may cause issues or create an increased workload in the system to compensate for blemishes represented in the data.

This application relates to structures and techniques for improving sensor evaluation, characterization, maintenance, and replacement. In some examples, an optical imaging device includes a sensor with a transparent protective layer. If a foreign object, an imperfection, defect, or damage is present on the lens and/or the protective layer of the sensor, a resulting image may include a blemish. In some cases, the blemish does not adversely affect the system, but in other instances it does. In examples, a blemish on an image is detected and then characterized to determine whether it would impact the system and should be resolved. This application discusses techniques for determining a ratio of the light intensity of the image lost to the blemish relative to an expected light intensity of the image without the blemish.

In certain examples, an imaging device may provide an image to a blemish detection and characterization system to analyze. In some examples, the system includes processors and media storing instructions that cause the processors to receive an image from the optical imaging device and generate a masked image based at least in part on applying a bandpass filter to the image. In certain examples, the system generates a transformed image based at least in part on applying a transformation function to the masked image. In certain examples, the system may detect a blemish based at least in part on the masked image and the transformed image. In some examples, the system determines a relative magnitude of the blemish relative to another area of the image, where the relative magnitude of the blemish indicates a severity of influence of the blemish on the image. In some examples, the system performs an action based at least in part on the relative magnitude of the blemish. For example, the action may include identifying a location of the blemish on the sensor and or lens of the imaging device. In examples, the action may include causing the imaging device to be cleaned, reworked, or replaced.

In certain examples, a test enclosure is used to capture images from the imaging device to evaluate. For example, a test enclosure may include a mounting structure that may removably couple the imaging device in a fixed orientation relative to the test enclosure. In certain examples, the test enclosure includes a first body having a concave surface defined by a substantially spherical sector configured to evenly disburse light reflected on the concave surface. In certain examples, the concave surface may act as a Lambertian surface and aid in evenly distributing the light to evenly illuminate the concave surface. In certain examples, the test enclosure includes a second body coupled to the mounting structure and coupled to the first body at a first interface. In this example, the mounting structure and the second body are configured to orient the lens of the image capturing device at the concave surface and locate the lens relative to the concave surface where the first interface is outside of the lens field of view. In some examples, the test enclosure includes a light source disposed in the second body and directed towards the concave surface of the of the first body to provide illumination to the concave surface. In some examples, the uniform illumination provides a consistent reference light source over the field of view of the imaging device. In some examples, the uniform illumination may help to reduce a variability in the blemish detection system and may enable the system to more readily detect and characterize a blemish.

Illustrative Autonomous Vehicle with Optical Sensors

FIG. 1 is an illustration of an example vehicle 100 having one or more optical sensors to collect information about the surroundings of the autonomous vehicle, in accordance with examples of the disclosure. The vehicle shown in FIG. 1 is a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, the energy management structures described herein may be applicable to non-autonomous and/or non-bidirectional vehicles as well. Also, while examples are given in which the vehicle is a land vehicle, the techniques described herein are also applicable to aerial, marine, and other vehicles.

In the illustrated example, the vehicle 100 includes an optical sensor assembly 102 coupled to a body 104. In certain examples, the vehicle 100 includes multiple optical sensors 102 disposed at various locations on the body 104. For example, multiple optical sensors 102 may be located on the vehicle 100 to provide views of an environment of the vehicle. In certain examples, the optical sensor 102 at a location may selected characteristics to enable certain capabilities or fulfil certain mission requirements. For example, depending on the location and application of the optical sensor 102, the optical sensor 102 may have a certain field of view, a certain resolution, and a certain capture rate. For example, an optical sensor used for navigating the environment at a highway speed, may have a relatively narrow field of view when compared to an optical sensor used for navigating a parking space.

In certain examples, the optical sensor assembly 102 has a sensor body 106 housing an optical sensor 108 configured to receive light 110 and generate a signal representative of the light 110 received. In certain examples, the optical sensor assembly 102 includes a lens 112 that is configured to focus the light 110 on to the optical sensor 108. In certain examples, the optical sensor assembly 102 includes a protective barrier 114 adjacent to a surface of the optical sensor 108. In certain examples, the protective barrier 114 is optically transparent and allows light to pass through the protective barrier 114 and onto the optical sensor 108. In certain examples, the protective barrier 114 provides mechanical protection to the optical sensor 108 which is often fragile and may be damaged during construction of or maintenance on the optical sensor assembly 102.

In certain examples, imperfections in the protective barrier 114 or foreign matter deposited on the protective barrier 114 may occur (of course, such imperfections may occur and be tested for any lens component of the optical sensor assembly 102). FIG. 1 shows an example, of a foreign object 116 located on the protective barrier 114. While measures can be taken during manufacturing and assembly of the optical sensor assembly 102, contaminants and or imperfections may still occur. In certain examples, detection of the contaminant or imperfection and determination of the severity, the optical sensor assembly 102 may be cleaned or reworked to reduce or eliminate the contaminant or imperfection.

The vehicle 100 in this example includes one or more computer systems 126 to control operation of one or more systems of the vehicle 100. For instance, in the case of an autonomous vehicle, the computer system(s) 126 may include one or more processors and memory and may be configured to control the vehicle 100 to, among other things, receive and process sensor data from one or more sensors, for example an optical sensor assembly 102, and to plan a route for the vehicle through an environment.

In some examples, the computer systems 126 controls operation of one or more systems of the vehicle 100. For instance, in the case of an autonomous vehicle, the computer system(s) 126 may include one or more processor(s) 128 and memory 130 communicatively coupled with the one or more processor(s) 128 and may be configured to control the vehicle 100 to, among other things, receive and process sensor data from one or more sensors and to plan a route for the vehicle through an environment. In some examples, the computer system 126 may also include controller 132 configured to control subsystems of the vehicle 100.

In the illustrated example, the vehicle 100 is an autonomous vehicle; however, the vehicle 100 could be any other type of vehicle, such as a semi-autonomous vehicle, or any other system having at least an image capture device (e.g., a camera enabled smartphone). Though depicted in FIG. 1 as residing in the body 104 for illustrative purposes, it is contemplated that the computer systems 126 be accessible to the vehicle 100 (e.g., stored on, or otherwise accessible by, memory remote from the vehicle 100, such as, for example, on memory of a remote computer device). In some examples, multiple computer systems 126 may be included on the vehicle 100. In some examples, computer systems 126 may be located within the body 104, a drive assembly, or combinations thereof.

The processor(s) 128 of the vehicle 100 may be any suitable processor capable of executing instructions to process data and perform operations as described herein. By way of example and not limitation, the processor(s) 128 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 130 is an example of non-transitory computer-readable media. Memory 130 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 130 may include at least a working memory and a storage memory. For example, the working memory may be a high-speed memory of limited capacity (e.g., cache memory) that is used for storing data to be operated on by the processor(s) 128. In some instances, memory 130 may include a storage memory that may be a lower-speed memory of relatively large capacity that is used for long-term storage of data. In some cases, the processor(s) 128 cannot operate directly on data that is stored in the storage memory, and data may need to be loaded into a working memory for performing operations based on the data, as discussed herein.

Figure 2B:
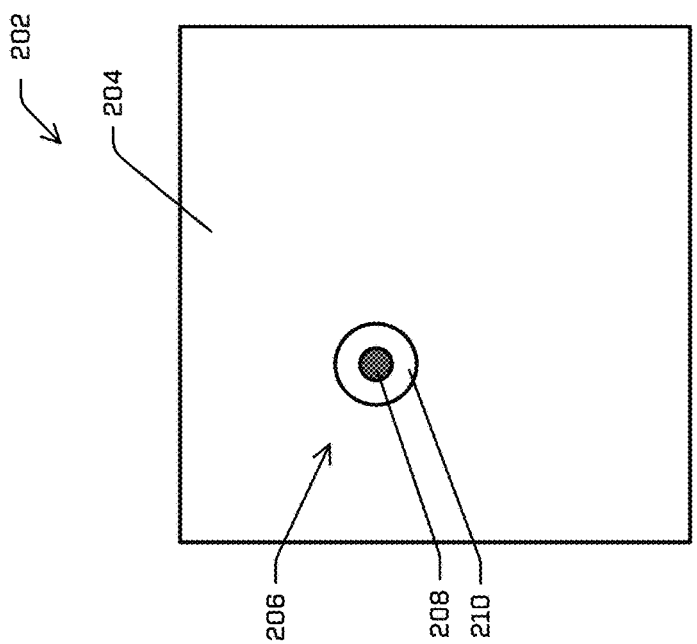
FIGS. 2A and 2B show the optical sensor assembly as shown in FIG. 1 and an illustrative schematic of a captured image, in accordance with examples of the disclosure.
Figure 2A:
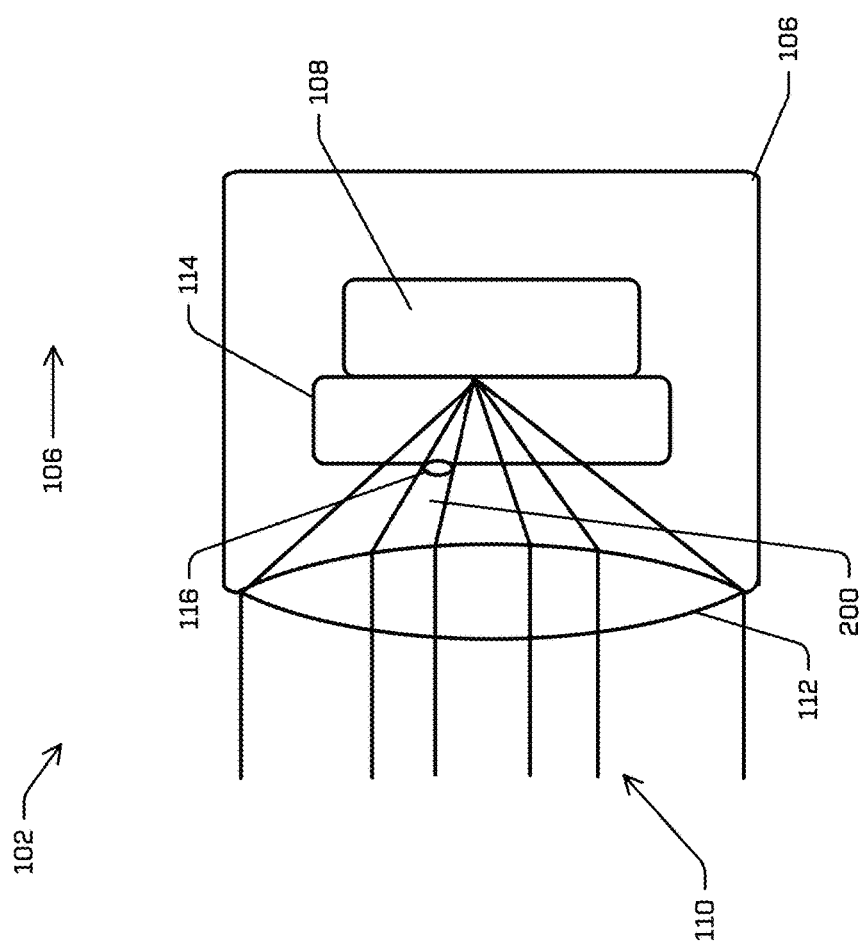

FIG. 2A shows the optical sensor assembly 102 as shown in FIG. 1. For example, the optical sensor assembly 102 includes the sensor body 106 housing an optical sensor 108 configured to receive light 110 and generate a signal representative of the light 110 received. In this example, the optical sensor assembly 102 includes a lens 112 that is configured to focus the light 110 on to the optical sensor 108. In this example, the optical sensor assembly 102 includes a protective barrier 114 adjacent to a surface of the optical sensor 108 and allows light 110 to pass from lens 112 to optical sensor 108. In certain examples, the protective barrier 114 is optically transparent and allows light to pass through the protective barrier 114 and onto the optical sensor 108. In certain examples, the protective barrier 114 provides mechanical protection to the optical sensor 108 which is often fragile and may be damaged during construction of or maintenance on the optical sensor assembly 102.

In this example, a foreign object 116 is located on the protective barrier 114. While measures can be taken during manufacturing and assembly of the optical sensor assembly 102, contaminants and or imperfections may still occur. In certain examples, detection of the contaminant or imperfection and determination of the severity, the optical sensor assembly 102 may be cleaned or reworked to reduce or eliminate the contaminant or imperfection.

In certain examples, foreign object 116 affects a portion of light 200 of light 110 when passing from the lens 112 to the optical sensor 108. In examples, this portion of light 200 may be absorbed, scattered, reflected, refracted, or diverted by foreign object 116 and may affect the light that the optical sensor 108 receives.

FIG. 2B shows an illustrative schematic of a captured image 202 of captured by the optical sensor 108 with foreign object 116 present on protective barrier 114. In this example, the captured image 202 shows a white background 204 with a blemish 206. In certain examples, the blemish 206 includes an umbra region 208 and a penumbra region 210. In this example, the umbra region 208 shows a portion of the image corresponding to a portion of the optical sensor 108 where all or most of the light 110 and portion of light 200 was prevented from reaching. This often results in a darker portion of the image when compared to what the portion of the image would be without the effects of the foreign object 116. Additionally or alternatively, the captured image 202 shows the penumbra region 210 a portion of the image corresponding to a portion of the optical sensor 108 where most or some of the light 110 and portion of light 200 was prevented from reaching. This often results in a darker portion of the image when compared to what the portion of the image would be without the effects of the foreign object 116. In certain examples, the penumbra region 210 may appear lighter when compared to the umbra region 208.

In certain examples, the size of the blemish 206 and the sizes of the umbra region 208 and penumbra region 210 depend on the components of the system as well as the environment. For example, the size of the blemish 206 depends on the size and composition of the foreign object 116. For example, as the size of foreign object 116 increases relative to the optical sensor 108 and/or lens 112, the size of the blemish 206 may increase. In certain examples, the size of the blemish 206 is less sensitive to the size of the foreign object 116. In these examples, the foreign object is relatively small. In these examples, the blemish 206 may exhibit a characteristic size that does not change as the foreign object 116 increases or decreases in size. Additionally or alternatively, the composition of the foreign object 116 may affect the size and/or relative darkness of the blemish 206. For example, if the foreign object 116 is composed of an optically absorptive material, the portion of light 200 may be absorbed resulting in a darker blemish, when compared to the foreign object 116 being composed of an optically transmissive material. In examples, if the foreign object 116 is composed of an optically transmissive material, the portion of light 200 may be scattered or redistributed resulting in a larger penumbra region when compared a penumbra region associated with the foreign object 116 being composed of an optically absorptive material.

In certain examples, the distance between the foreign object 116 and the optical sensor 108 affects the size and/or relative darkness of the blemish 206. For example, if the foreign object 116 is small enough or the distance from the optical sensor is great enough, or a focal length of the lens 112 is wide enough, or a combination thereof, the blemish 206 may include a relatively small umbra region when compared to examples, where the size of the foreign object 116 is larger, the distance from the sensor is shorter, the focal length of the lens is larger, or combinations thereof. In some examples, the if the foreign object 116 is small enough or the distance from the optical sensor is great enough, or a focal length of the lens 112 is wide enough, or a combination thereof, the blemish 206 may include an antumbra region (not pictured) where the foreign object 116 disrupts the light 110 leading to other optical artifacts resulting in the captured image 202.

Figure 3A:
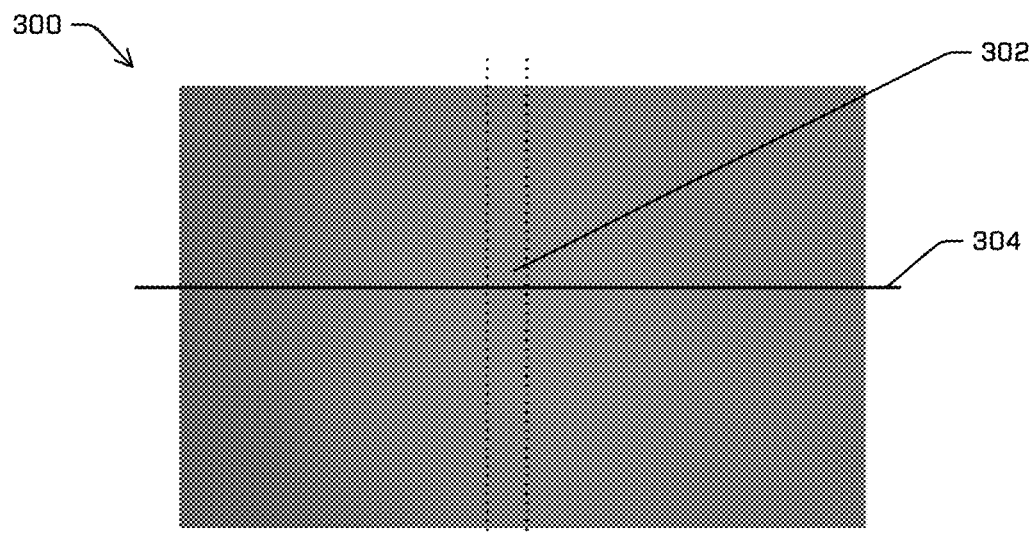
FIGS. 3A, 3B, and 3C show an illustrative captured image, a relative light intensity plot, and an illustrative blemish ratio image, in accordance with examples of the disclosure.

FIG. 3A shows an illustrative captured image 300 that has been captured from an optical imaging device, for example, an optical sensor assembly 102. However, any optical sensor may be used to capture the image. In this example, image 300 shows a blemish 302. In examples, the blemish 302 may be easily detectable by a human eye. In examples, the blemish 302 may be difficult to detect by a human eye. In certain examples, a blemish that may be difficult to detect by a human eye may still have an effect on or cause problems for a computer-based recognition system. For example, a blemish may distort or block a portion of a field of view for an autonomous driving system causing a system to miss identify or not see an object in the environment. For example, in some cases, a blemish may cause a light, for example a traffic light, to scatter and be spread over a larger than expected portion of the sensor. In this example, the system may identify the traffic light as something other than a traffic light, or not identify it at all.

FIG. 3A shows a reference line 304 intersecting a portion of the blemish 302 and reference lines 306 and 308 forming approximate tangent lines to an approximate edge of the blemish 302.

Figure 3B:
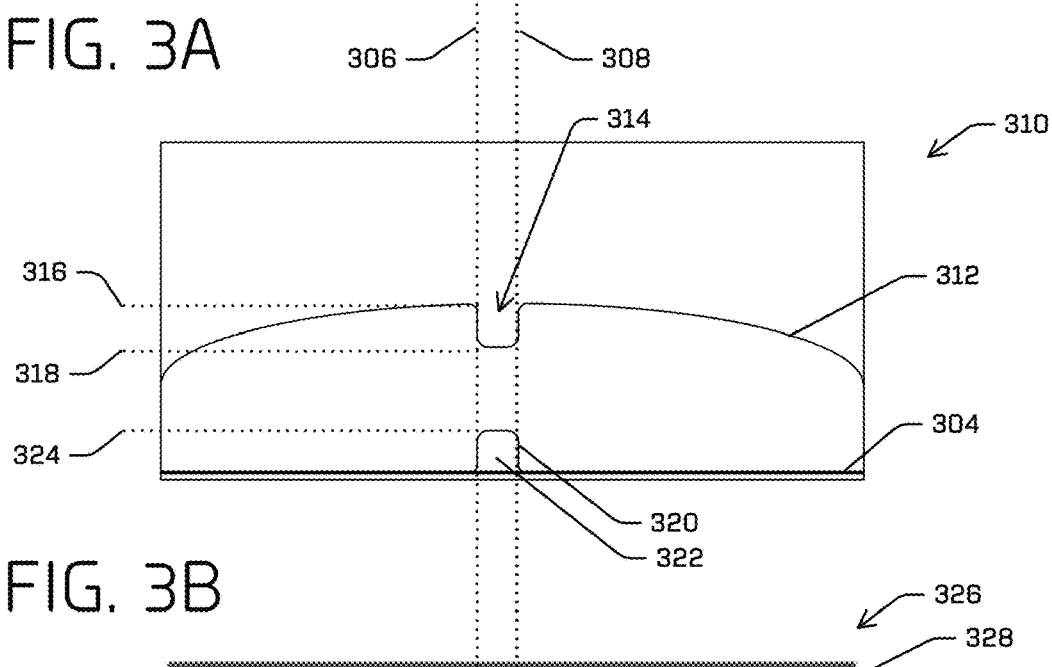

FIG. 3B shows a 2D plot 310 of the approximate light intensity 312 of the image 300 along the reference line 304. FIG. 3B shows region 314 of the approximate light intensity 312 line. In certain examples, region 314 represents the amount of light that a foreign object or blemish on the optical sensor prevents from reaching the optical sensor resulting in the blemish 302 on the image 300. In this example, FIG. 3B shows the approximate light intensity adjacent to region 314 at a first intensity level 316 and an approximate light intensity within region 314 at a second intensity level 318.

FIG. 3B also shows an approximate light intensity 320 that is missing from the approximate light intensity 312 that would be expected at the region 314 if the blemish 302 was not present on the image 300. In at least some examples, the light intensity 320 may be associated with a post-processed image. As a non-limiting example, the captured image 300 may be first transformed (e.g., using a Fourier transform), a bandpass filter may be applied to the transformed image, and the resultant filtered and transformed image may be transformed back (e.g., using an inverse Fourier transform). Light intensity 320 may be representative of the corresponding line of the transformed image as that of light intensity 312. For example, FIG. 3B shows a region 322 that corresponds to the region 314. In this example, the region 322 represents the light missing at the region 314 causing the blemish 302. In this example, the approximate light intensity missing from the region 314 is shown at the region 322 at third intensity level.

Figure 3C:
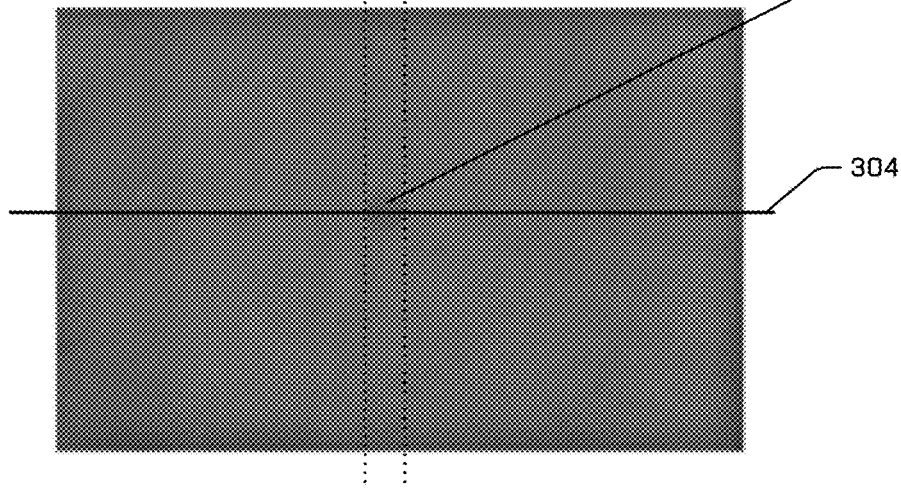

FIG. 3C shows an illustrative blemish ratio image 326 based on the image 300. In this example, the blemish ratio image 326 shows blemish 302 of FIG. 3A as a higher contrast region 328. In certain examples, the blemish ratio image 326 is based at least in part on the differing ratios between the light insensitivity levels. In various examples, such an intensity may be determined as a ratio of the light intensity 320 to a sum of light intensity 320 and light intensity 312. Similarly, the difference between the first intensity level 316 and the second intensity level 318 shown in FIG. 3B drives the third intensity level 324. In certain examples, the blemish ratio may be a ratio between the third intensity level 324 and the first intensity level 316. In certain examples, the blemish ratio may be a ratio between the third intensity level 324 and a sum of the second intensity level 318 and the third intensity level 324. While this is a simplified 2D illustration, embodiments contemplate that the blemish ratio may be determined over the reference line 304 continuously, at discrete intervals, increments, points, or combinations thereof. Additionally or alternatively, embodiments contemplate that the blemish ratio may be determined over the whole image 300, for example, in two dimensions, continuously, at discrete intervals, increments, points, or combinations thereof. For example, FIG. 3C shows the illustrative blemish ratio image 326 representing the blemish ratio in two dimensions over image 300.

Illustrative Blemish Detection and Quantification Systems and Techniques

Techniques, apparatuses, and systems described herein can be implemented in a number of ways. Example implementations are provided below with reference to the following figures. Although discussed in the context of an autonomous vehicle, the techniques, apparatuses, and systems described herein can be applied to a variety of systems requiring optical sensors that may be sensitive to blemishes in the optical sensor outputs. The techniques described herein are not limited to autonomous vehicles. In another example, the techniques, apparatuses, and systems may be utilized in an aviation or nautical context. Additionally, the techniques described herein may be used with data captured in a controlled environment at one time, data captured in an operational or uncontrolled environment over multiple time periods, or any combination thereof. Additionally or alternatively, the illustrative examples may be implemented in software or in hardware contexts.

Figure 4:
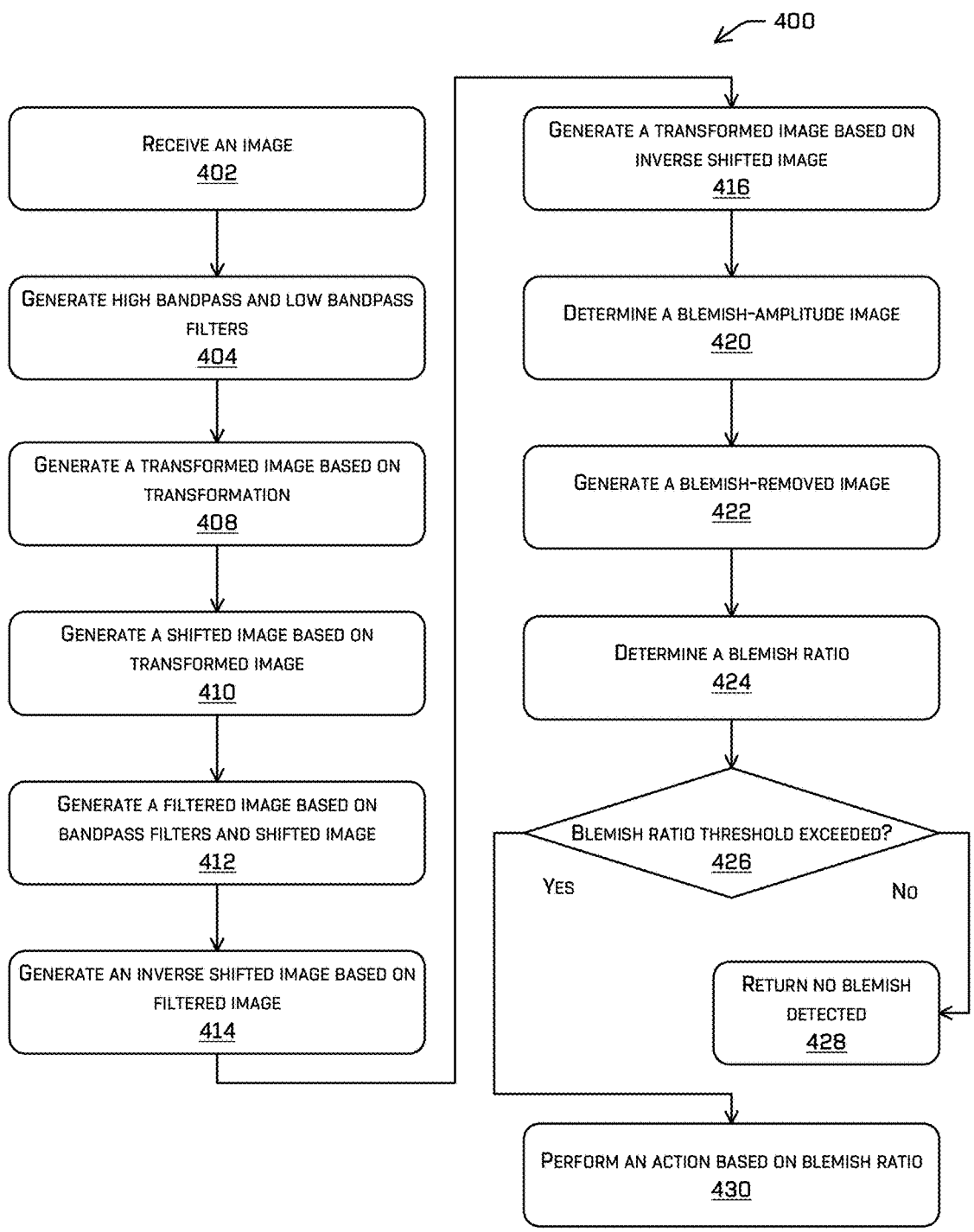
FIG. 4 is a flow chart showing an illustrative example method and process involving blemish detection and characterization, in accordance with examples of the disclosure.

FIG. 4 is a flow chart showing an illustrative example method and process involving blemish detection and characterization. FIGS. 5A-10B show illustrative examples of selected processes referenced in FIG. 4. While shown in FIGS. 5A-10B, example implementations contemplate that not every illustrative plot or step need be created or displayed as part of the illustrative processes.

The technique illustrated in FIGS. 4-10 are described with reference to one or more of the vehicles, sensors, and/or systems shown in FIGS. 1-16 for convenience and ease of understanding. However, the techniques and processes illustrated in FIGS. 4-10 are not limited to being performed using the vehicles, sensors, and/or systems shown in FIGS. 1-16, and may be implemented using any of the other vehicles, sensors, and/or systems described in this application, as well vehicles, sensors, and/or systems other than those described herein. Moreover, the vehicles, sensors, and/or systems described herein are not limited to performing the methods and processes illustrated in FIGS. 4-10.

FIG. 4 depicts an example process 400 of blemish detection and characterization in an image captured by an optical sensor. At operation 402, the blemish detection system may receive optical sensor data, for example, an image. In examples, the optical sensor may be mounted in a test environment providing a uniform surface for the optical sensor to capture the image. In examples, the uniform surface may be uniformly illuminated. In examples where the surface is uniform and uniformly illuminated, a consistent image may be captured across the field of view of the optical imaging device and may allow a blemish to be more readily detected since differing objects in the fore and/or back grounds will not be present presenting a false positive, hiding or masking a blemish, or any combination thereof. Additionally or alternatively, the optical sensor may be place in a non-uniform environment. In these examples, multiple images may be captured over time and differing environments or changing fore and/or background objects and compared to determine a consistent and/or persistent localized removing, missing, warping, or distortion of a region of an image.

Figure 5A:
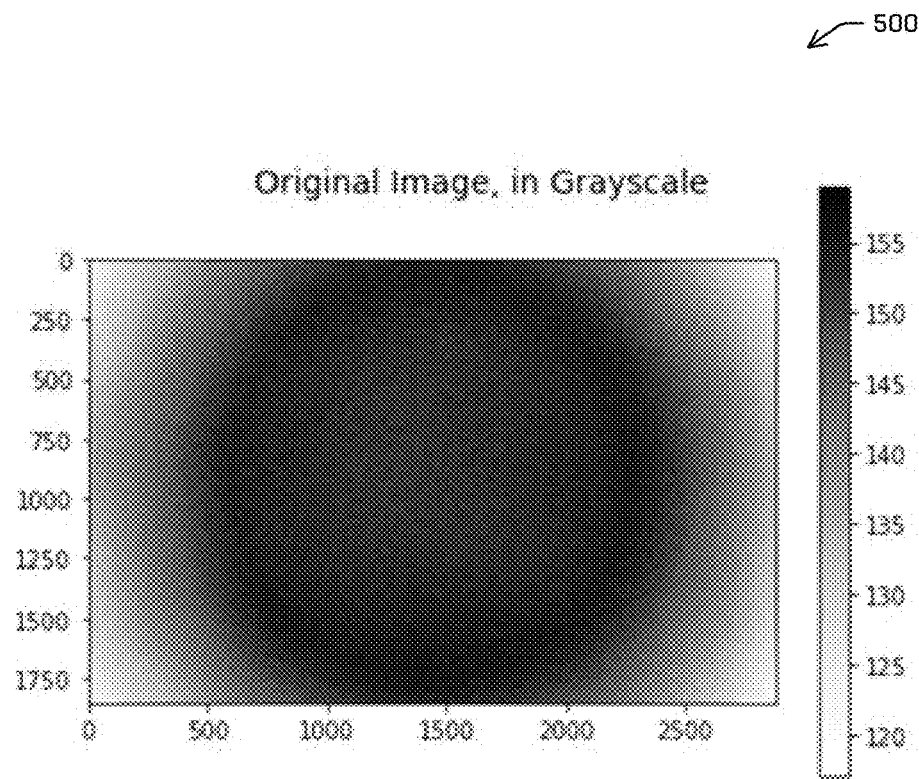
FIGS. 5A and 5B show illustrative examples of selected processes referenced in FIG. 4, in accordance with examples of the disclosure.

FIG. 5A shows an illustrative captured image from an optical sensor. In this example, image 500 is a grayscale representation of the image. This image may have a blemish within the image due to and cause an imperfection of a lens, sensor, and/or protective barrier of the optical sensor, and/or a foreign object located on the lens, sensor, and/or protective barrier affecting the light entering the optical sensor. In this example, the blemish may exceed a threshold that may impact the ability of the optical sensor to operate adequately in a given operational environment. In this example, the image is from an optical sensor with a relatively wide angle field of view. This results in a generally circular shape of the image from approximately pixel 500 to pixel 2200 on the horizontal axis.

In certain examples, the blemish detection system may perform initial modifications to the image at this stage. For example, if a lens of the optical sensor has a focal length that is below a threshold causing a wide angle view, for example, a fisheye lens, the system may remove parts of the image that correspond to areas outside of the field of view of the lens. For example, a radius of an image corresponding to field of view of the lens may be selected and information outside of the radius is removed. In certain examples, the resulting image with the information removed may be padded. In certain examples, the border of the circle defined by the radius may be repeated. In certain examples, the image may be padded to a desired image size. In certain examples, the image is padded out to at least 8000 px. In certain examples, the image is padded out to between 8000 and 9000 px. Additionally or alternatively, the blemish detection system may duplicate the original image and convert it to a single-precision floating-point format, for example, float32 or FP32, among others.

Figure 5B:
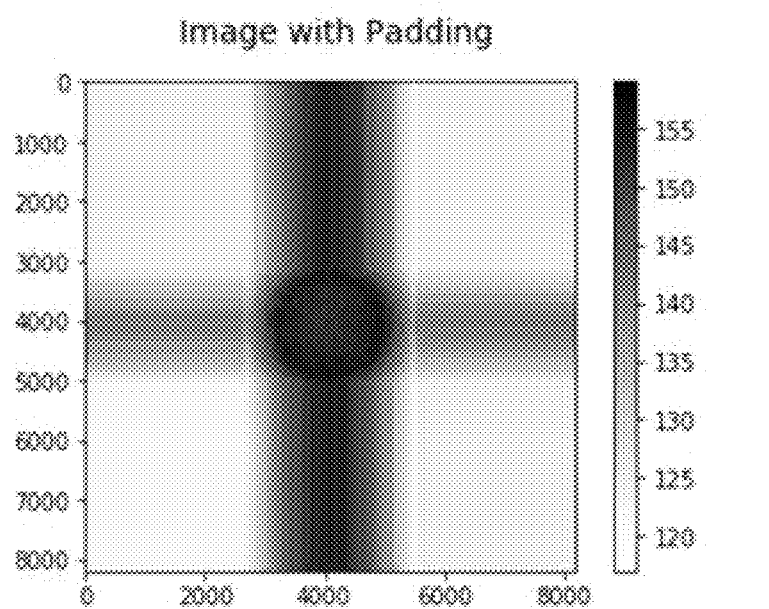

FIG. 5B shows an illustrative image 502 from a relatively wide angle lens. As illustrated, such padding need not be uniform (e.g., setting all padded values to 0, 1, 255, etc.). In such examples, padded values may be determined so as to minimize impact of padding while allowing computations (e.g., Fourier transforms, band passes, etc.) on the original image. In this example, the image shown in FIG. 5A has been padded by repeating the border area surrounding the image region associated with the field of view of the lens.

Returning to FIG. 4, at operation 404, the blemish detection system generates high bandpass and the low bandpass filters. For example, the system may generate a masked image based at least in part on applying a bandpass filter to the image where the high bandpass filter is based at least in part on a first feature size, and a first filter algorithm and the low bandpass filter based at least in part on a second feature size, and a second filter algorithm. In certain examples, the first feature size may include a number of pixels or a range of pixels. For example, cutoff frequencies may be based on pixel dimensions in the original image. In certain examples, a window of cutoff frequencies may between 1 and 10% of the image size. For example, if an image is approximately 3000-8000 px in at least one dimension, a window of cutoff frequencies may between 30 to 300 px, 80-800 px, 30-800 px, 50 to 600 px, or combinations thereof. In certain examples, observed blemishes have a characteristic size that varies little with a size of a foreign object that may create the blemish. In certain examples, the blemish may measure approximately 150 px in diameter. In certain examples, the window of cutoff frequencies may be tailored to keep the magnitude of the blemish in a detectable range. For example, if the window of cutoff frequencies is narrowed too much, the magnitude of the blemish feature decreases.

In certain examples, the first filter algorithm and the second filter algorithm are one or more of a Gaussian-based filter, a Butterworth-based filter, or a Fourier transform-based filter.

In certain examples, a gaussian-based algorithm is applied to generate the mask filter. The following is illustrative pseudo code implementing an illustrative bandpass filter:

```
#Bandpass filter variables
min_feature_size=50 #pixels
max_feature_size=600 #pixels
lpf_order=1
hpf_order=1
#X/Y-Axis Cutoff Frequencies for Low Pass (LPF) and
    High Pass (HPF) Filters
fc_lpf_x=NumColumns/min_size_px
fc_lpf_y=NumRows/min_size_px
fc_hpf_x=NumColumns/max_size_px
fc_hpf_y=NumRows/max_size_px
#Generate 2D Gaussian Filters
hpf_mask=np.exp(-0.5*((X/fc_hpf_x)**(2*hpf_order)+
    (Y/fc_hpf_y)**(2*hpf_order)))
lpf_mask=np.exp(-0.5*((X/fc_lpf_x)**(2*lpf_order)+
    (Y/fc_lpf_y)**(2*lpf_order)))
#Combine into Bandpass
mask=lpf_mask*(1−hpf_mask)
```

In certain examples, the bandpass filter "mask" may consist of the difference of two Gaussian functions.

Figure 6A:
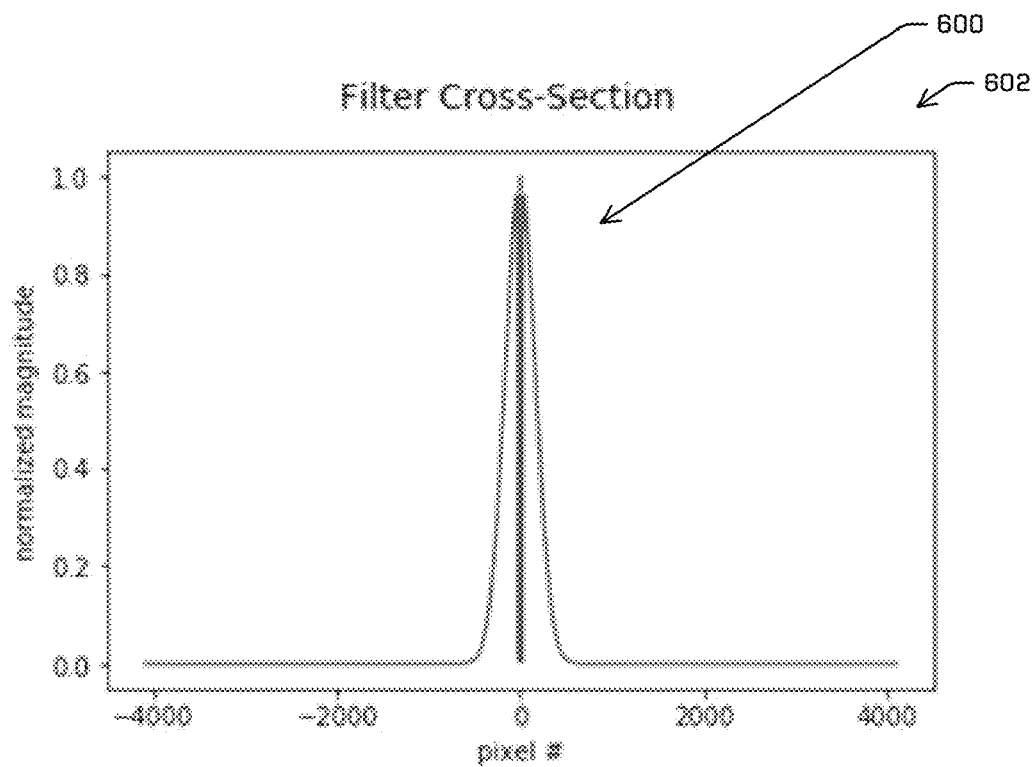
FIGS. 6A and 6B show illustrative examples of selected processes referenced in FIG. 4, in accordance with examples of the disclosure.
Figure 6B:
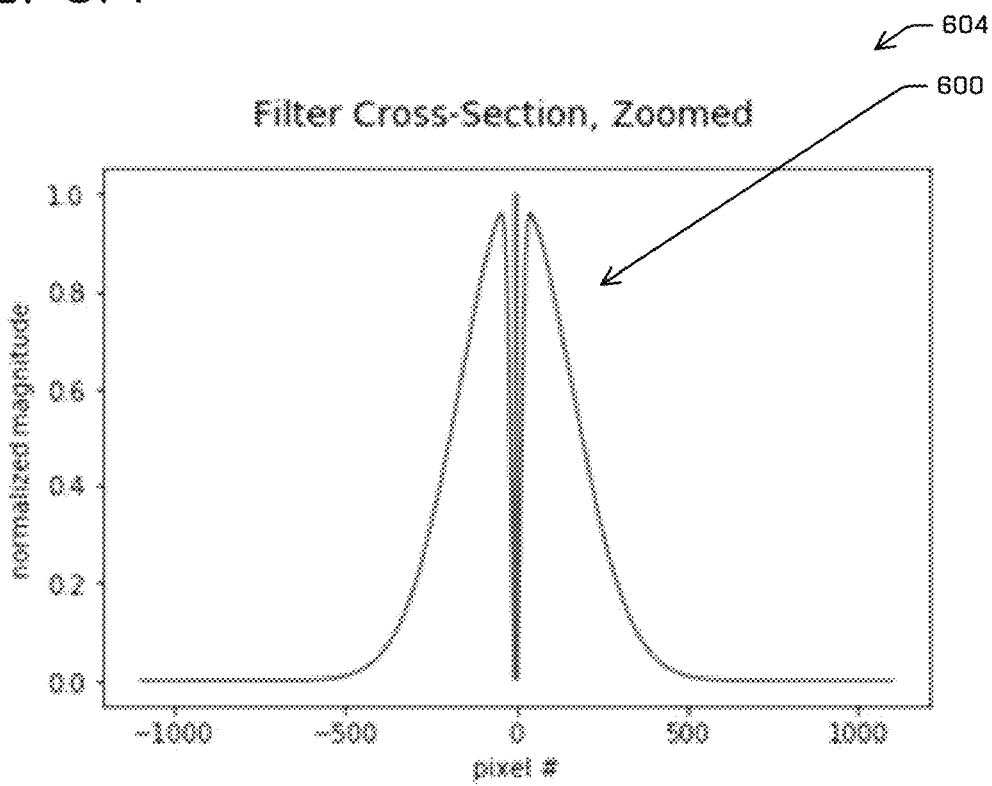

FIGS. 6A and 6B show illustrative filter 600 shown in plots 602 and 604. In this example, the filter is based on a Gaussian distribution and may be applied to the image to apply a "mask" and generate a masked image.

Figure 7A:
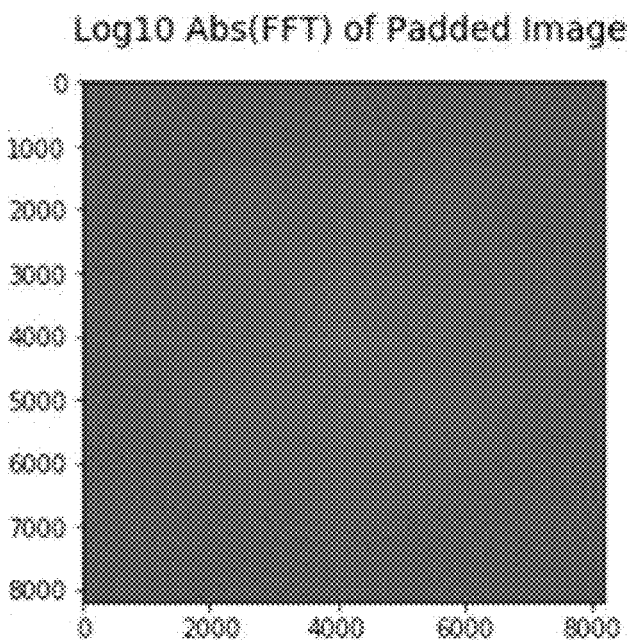
FIGS. 7A and 7B show illustrative examples of selected processes referenced in FIG. 4, in accordance with examples of the disclosure.
Figure 7B:
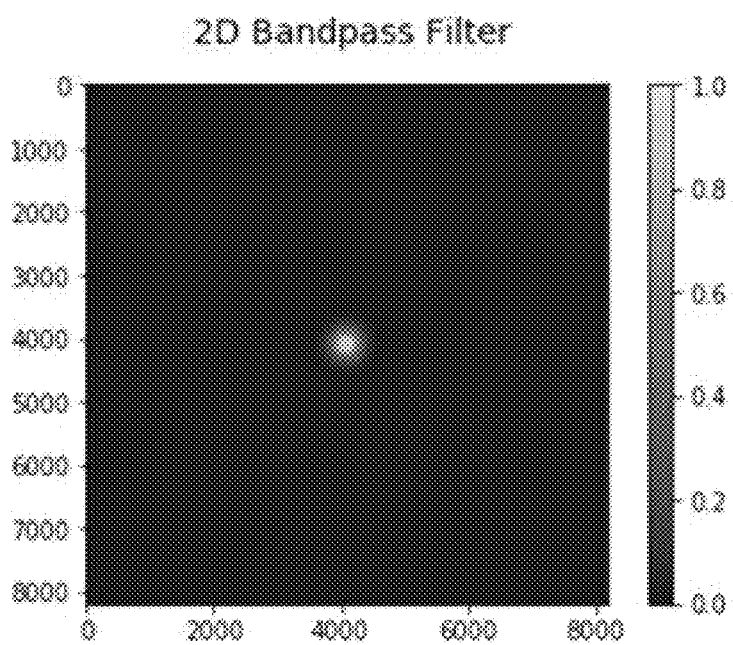
Figure 8A:
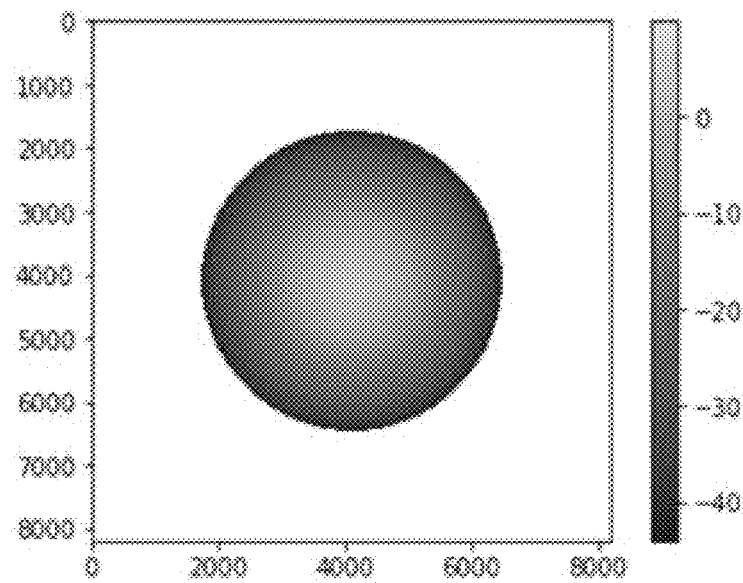
FIGS. 8A and 8B show illustrative examples of selected processes referenced in FIG. 4, in accordance with examples of the disclosure.
Figure 8B:
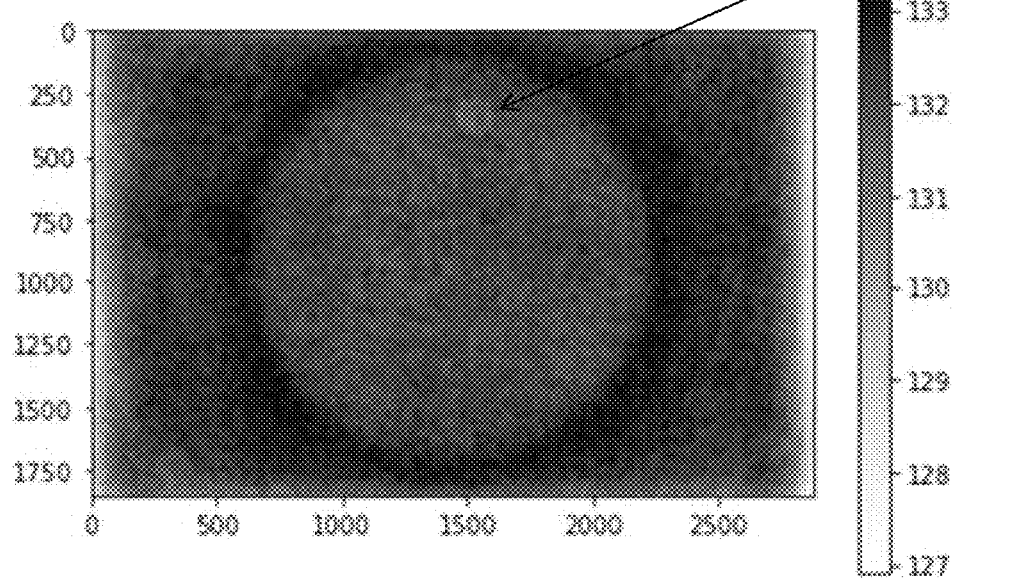

FIGS. 7A, 7B, 8A, and 8B show illustrative examples of generating a filtered image. For example, FIG. 7A shows a plot 700 of a transformation filter applied to the padded image with the absolute value of the transformation displayed. FIG. 7B shows a plot 702 of an illustrative two dimensional bandpass filter. In this example, the filter is focused on the area in the center of the plot associated with the field of view of the image. FIG. 8A shows plot 800 illustrating the filter of plot 702 applied to the plot 700 to generate the mask to be applied to the image. FIG. 8B shows an illustrative example of the mask shown in FIG. 8A applied to the image shown in FIG. 5A to generate filtered image 802. In this example, a blemish 804 becomes more visible and/or identifiable when compared to the image in FIG. 5A.

Returning to FIG. 4, at operation 408, the blemish detection system generates a transformed image based on a transformation. In certain examples, the system generates a transformed image based at least in part on applying a transformation function to the image. For example, a Fourier transformation may be applied to the masked image in the form of a Fast Fourier Transform (FFT) algorithm. In certain examples, the image may be the original image, a padded image, a stripped image, a cropped image, a processed image, or combinations thereof.

At operation 410, the blemish detection system generates a shifted image based on the transformed masked image. For example, the shifted image is based at least on applying a Fourier shift operation to the transformed masked image. For example, the image may be shifted while in the Fourier space.

At operation 412, the blemish detection system applies the bandpass filters to the shifted image to generate a filtered image. In certain examples, the masked image is set to a single-precision floating-point format, for example, float32 or FP32, among others. In certain examples, the center pixel of the mask is set to 1 to maintain the DC component or average of the pixel values.

At operation 414, the blemish detection system generates an inverse shifted image based on the weighed image. For example, an inverse Fourier shifted image may be generated based at least in part on applying an inverse Fourier shift operation to the weighted image.

At operation 416, the blemish detection system generates a transformed image based on the inverse shifted image. For example, the transformed image is based at least in part on applying an inverse Fourier transformation to the inverse Fourier shifted image.

At operation 420, the blemish detection system determines a relative magnitude of a blemish, if present, relative to another area of the image. In certain examples, the relative magnitude of the blemish indicates a severity of influence of the blemish on the image. For example, at operation 420, the blemish detection system determines a blemish-amplitude image. For example, a blemish-amplitude image is based at least in part on a mean value of the transformed image. In this example, the system may subtract a mean value of the filtered image from itself to generate the blemish-amplitude image.

Figure 9A:
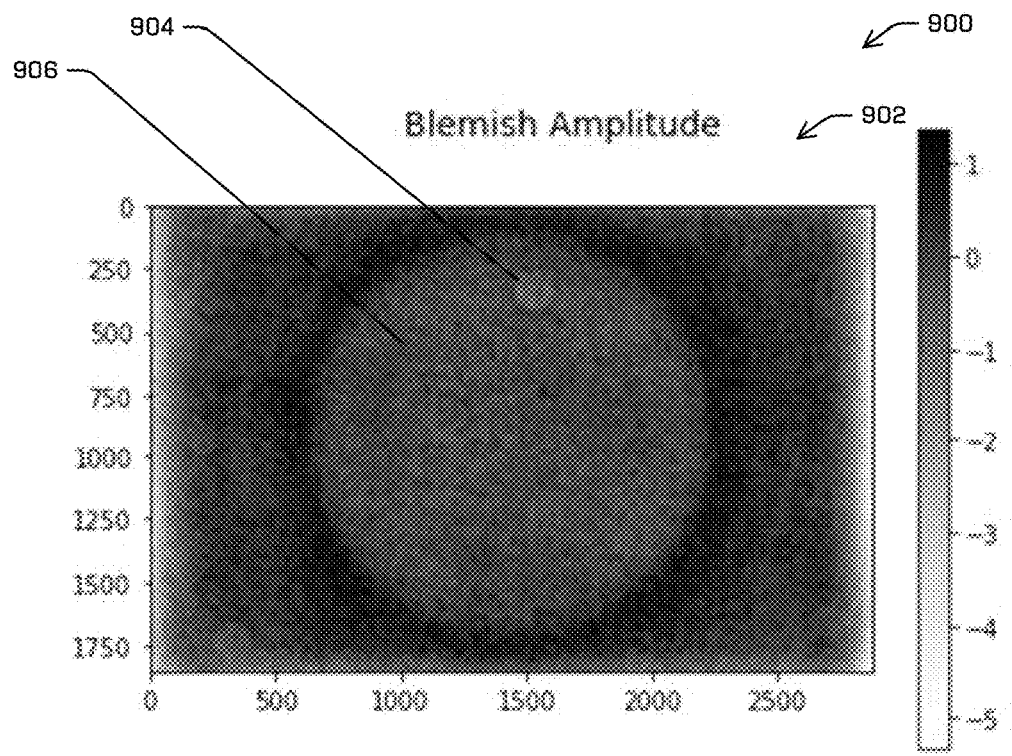
FIGS. 9A and 9B show illustrative examples of selected processes referenced in FIG. 4, in accordance with examples of the disclosure.

FIG. 9A shows a plot 900 of an illustrative image 902 of the blemish amplitude of the image shown in FIG. 5A. FIG. 9A shows a magnitude of the blemish 904 when compared to other portions of the field of view of the image 906.

Returning to FIG. 4, at operation 422, the blemish detection system generates a blemish-removed image. In certain examples, the blemish-removed image is based at least in part on a difference between the blemish-amplitude image and the image. For example, a blemish-removed image is generated by subtracting the "blemish-amplitude" image from the float32 version of initial (unfiltered) image. In certain examples, the system may truncate the blemish-removed image to a certain range. In certain examples, the range is to [0:255].

Figure 9B:
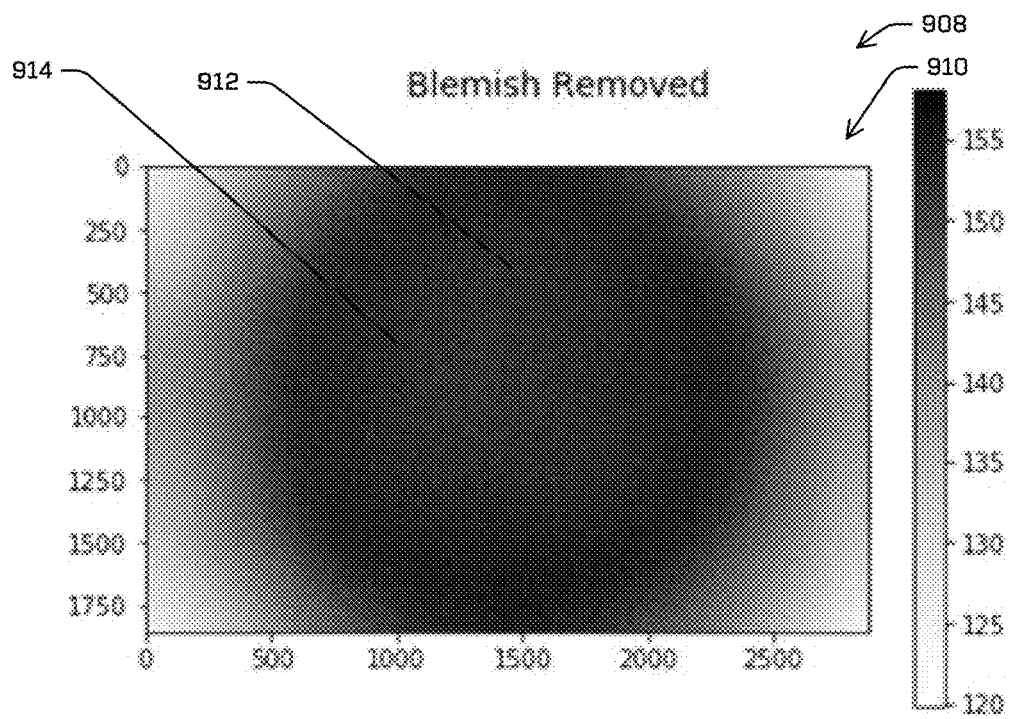

FIG. 9B shows a plot 908 of an illustrative image 910 of an illustrative blemish removed image corresponding to the image shown in FIGS. 5A and 9A. In this example, image 910 depicts a predicted image that would occur if the blemish was not present in the original image. In this image, the region 912 that corresponds to the blemish magnitude 904 is more consistent with surrounding areas 914 corresponding to the field of view of the image.

Returning to FIG. 4, at operation 424, the blemish detection system determines a blemish ratio. For example, the blemish ratio is based at least in part on a ratio between the blemish-amplitude image and the blemish-removed image. FIGS. 3B and 3C show an example of a blemish-amplitude image and a blemish-removed image compared to show a blemish ratio.

At operation 426, the blemish detection system detects whether a blemish ratio threshold is exceeded. For example, a blemish ratio threshold may indicate a level at which the blemish may impact a system using data captured by the sensor. In some examples, a blemish ratio threshold indicates a severity of blemish that makes the sensor unfit for a specific use while the blemish is present. In some examples, the blemish ratio threshold indicates a severity of blemish that allows a system using the sensor to compensate for the blemish. In examples, multiple blemish ratio thresholds may be applied to determine an action to be taken. For example, exceeding a first threshold but not a second threshold may indicate that the blemish may be compensated for by a system using the sensor. In examples, exceeding both the first and second threshold may indicate that the sensor should be cleaned, reworked, removed, used in another application, shutdown, or combinations thereof.

In certain examples, if the blemish ratio threshold is not exceeded, then at operation 430, the blemish detection system may return and indication that a blemish was not detected on the image. In some examples, regardless of whether a blemish is explicitly detected at operation 426, the blemish detection system may continue the analysis. For example, the blemish detection system may apply multiple blemish ratio thresholds. In examples, the system may return that a blemish was not detected relative to a specified and/or corresponding blemish ratio threshold.

In certain examples, the blemish detection system may apply additional operations. For example, the system may exclude regions outside of the associated field of view of the lens capturing the image. For example, if an image is captured by a fisheye lens, the areas of the image outside of radius may be truncated or excluded.

Figure 10A:
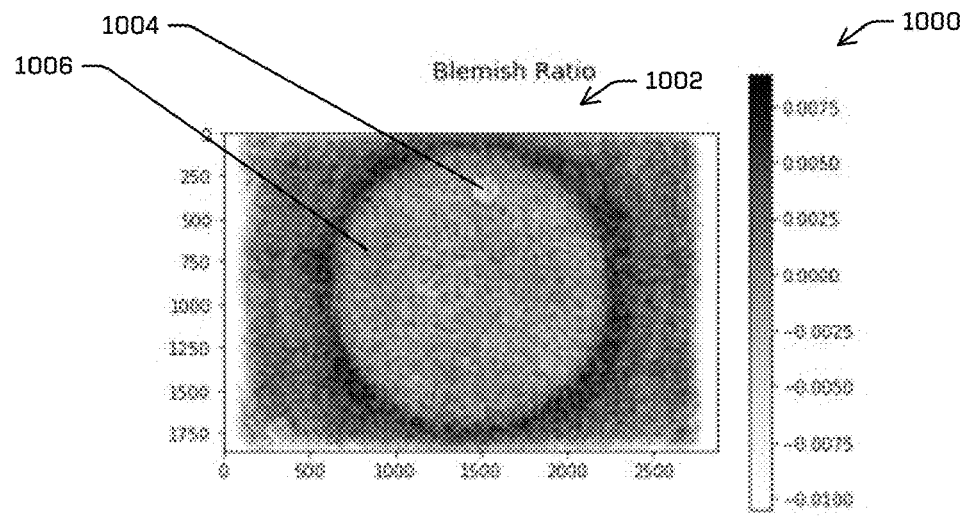
FIGS. 10A, 10B, and 10C show illustrative examples of selected processes referenced in FIG. 4, in accordance with examples of the disclosure.
Figure 10B:
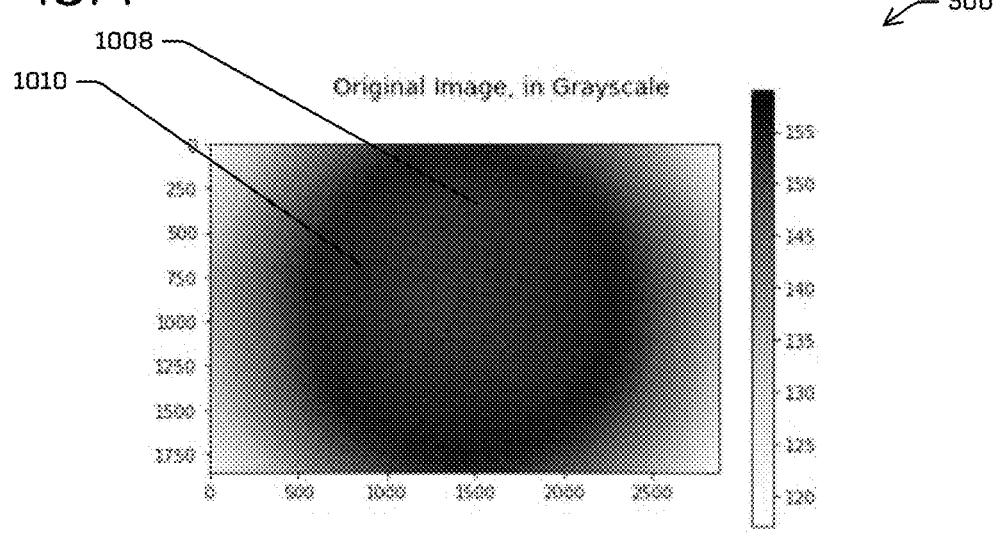

FIG. 10A shows a plot 1000 of an illustrative image 1002 of an illustrative blemish ratio image corresponding to the image shown in FIGS. 5A and 10B. In this example, image 1002 depicts a ratio between the amount of light reaching the sensor corresponding to the location of the blemish 1004 and the amount of light reaching the sensor in areas 1006 that were not affected by or with blemish inducing cause removed. In this example, the blemish 1004 is much more visible relative to areas 1006 than when compared to blemish areas 1008 and areas 1010 as shown in image 500 of FIG. 10B.

Returning to FIG. 4, at operation 428, the blemish detection system performs an action based on the blemish ratio. For example, the action is based at least in part on the relative magnitude of the blemish relative to other portions of the image. In certain examples, the action may include determining a location of the blemish on the optical imaging device. In examples, this is based at least in part on one or more of the image, the masked image, or the transformed image. In examples, the action may include causing the optical sensor to be reworked, cleaned, or removed from service. In examples, the action may include providing a notice that the optical sensor does not meet the optical requirements.

Additionally or alternatively, the blemish detection system may apply thresholds on the blemish ratio to determine whether the optical sensor is suitable for use. For example, bounds may be applied as thresholds to portions and/or regions of the image, for example, the image center, edges, and/or corners. In examples, a binary image is generated show areas where the blemish ratio is below the minimum threshold.

Figure 10C:
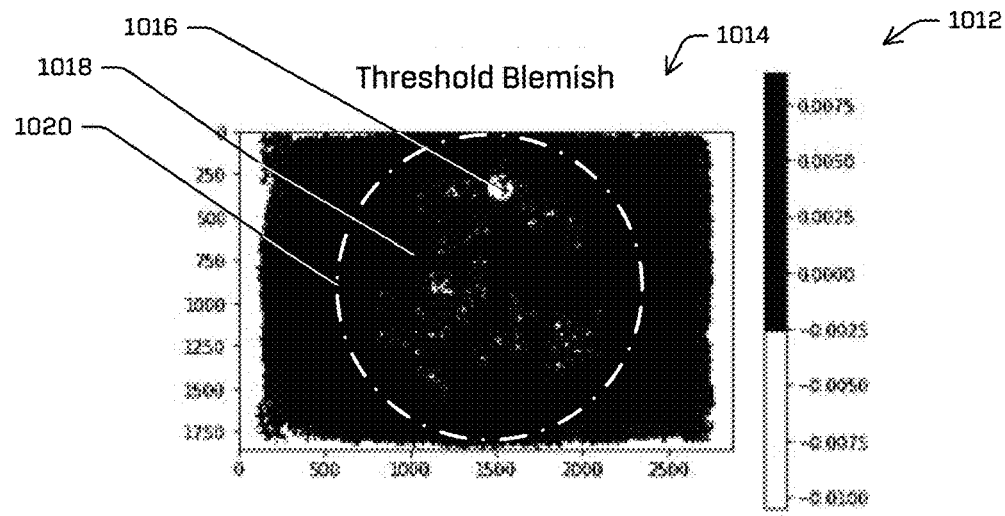

FIG. 10C shows a plot 1012 of an illustrative image 1014 of an illustrative blemish ratio threshold image corresponding to the image shown in FIGS. 5A and 10B and the blemish ratio image shown in FIG. 10A. In this example, the image 1014 depicts a binary image showing where the blemish ratio is below a minimum threshold. In this example, the image 1014 shows a region 1016 corresponding to the location of the blemish 1004 and an area 1018 corresponding to the areas 1006 that were not affected by or with blemish inducing cause removed. In this example, the region 1016 shows that the blemish 1004 exceeds the limit set by the blemish ratio threshold. In examples, the threshold is defined such that a blemish is determined when a blemish exceeds a blemish ratio threshold. In examples, the threshold is defined such that a blemish is determined when a blemish is below a blemish ratio threshold.

In certain examples, only certain regions of an image are considered when determining whether a threshold is passed. For example, FIG. 10C shows a boundary 1020 enclosing a portion of the image. In certain examples, only areas within the boundary 1020 are considered. In certain examples, only areas outside of boundary 1020 are considered. In certain examples, multiple boundaries may be applied to define separate and/or overlapping regions. In examples, the regions may have a weighting associated with it. In certain examples, each region may have an independent blemish ratio threshold. For example, a sensor may have a field of view larger where only a first portion of the field of view is where first type of data will be collected while a second portion of field of view is where a second type of data will be collected. In this example, the first type of data may require or benefit from a lower amount or intensity or influence of a blemish, while the second type of data may be more blemish tolerant.

In examples, any indication of exceeding the blemish ratio threshold may trigger an action. In examples, a total area of an indication of exceeding the blemish ratio threshold may be used to trigger an action.

In certain examples, the boundary 1020 corresponds to a field of view limit associated with the sensor, for example, a lens field of view. In certain examples, the boundary 1020 corresponds to a field of view of an intended use of the sensor, for example, a sensor where a portion of the lens field of view is obstructed to directed towards a static object, while another portion is directed to an active and/or dynamic subject.

Blemish detection and characterization techniques discussed herein can improve the functioning of a computing device by identifying optical imaging devices providing substandard images. By identifying substandard images, the optical imaging device may be cleaned, reworked, or replaced. By correcting the imaging device, the systems using the imaging devices to collect data will have be able to use data that is unnecessarily distorted by blemishes. This allows the imaging devices to generate data representing an environment with a high degree of accuracy and precision about the environment while providing the desired field of view coverage of the vehicle. These and other improvements to the functioning of a computing device are discussed.

Additionally or alternatively, a mask may be generated based on the blemish ratio threshold image. In examples, the mask may be provided to a system using the sensor with a blemish. In this example, the system may use the mask to compensate for the blemish. For example, a vehicle may use the mask to weight data collected by the sensor. For example, data collected from an image corresponding to the blemish may be down-weighted. For example, the system may apply a lower confidence value on data associated with the blemish. Since, in some examples, the blemish may obscure, distort, and/or block a portion of a subject observed by the sensor, the system may rely less on data collected from the portion of the sensor associated with the blemish and rely more heavily on data collected from another portion of the sensor, another sensor, or combinations thereof.

The blemish detection techniques discussed herein also represent improvements over conventional techniques. For example, in the past, blemishes would be identified as readily before installation on an active vehicle. At that point, the blemish may go undiagnosed, but may interfere or require an additional computational load to compensate for. In contrast, techniques described herein may allow for blemish identification, characterization, and if necessary remediation of the sensors at the sensor level and may be conducted separately from the vehicle, for example, while the vehicle is still in service.

Figure 11:
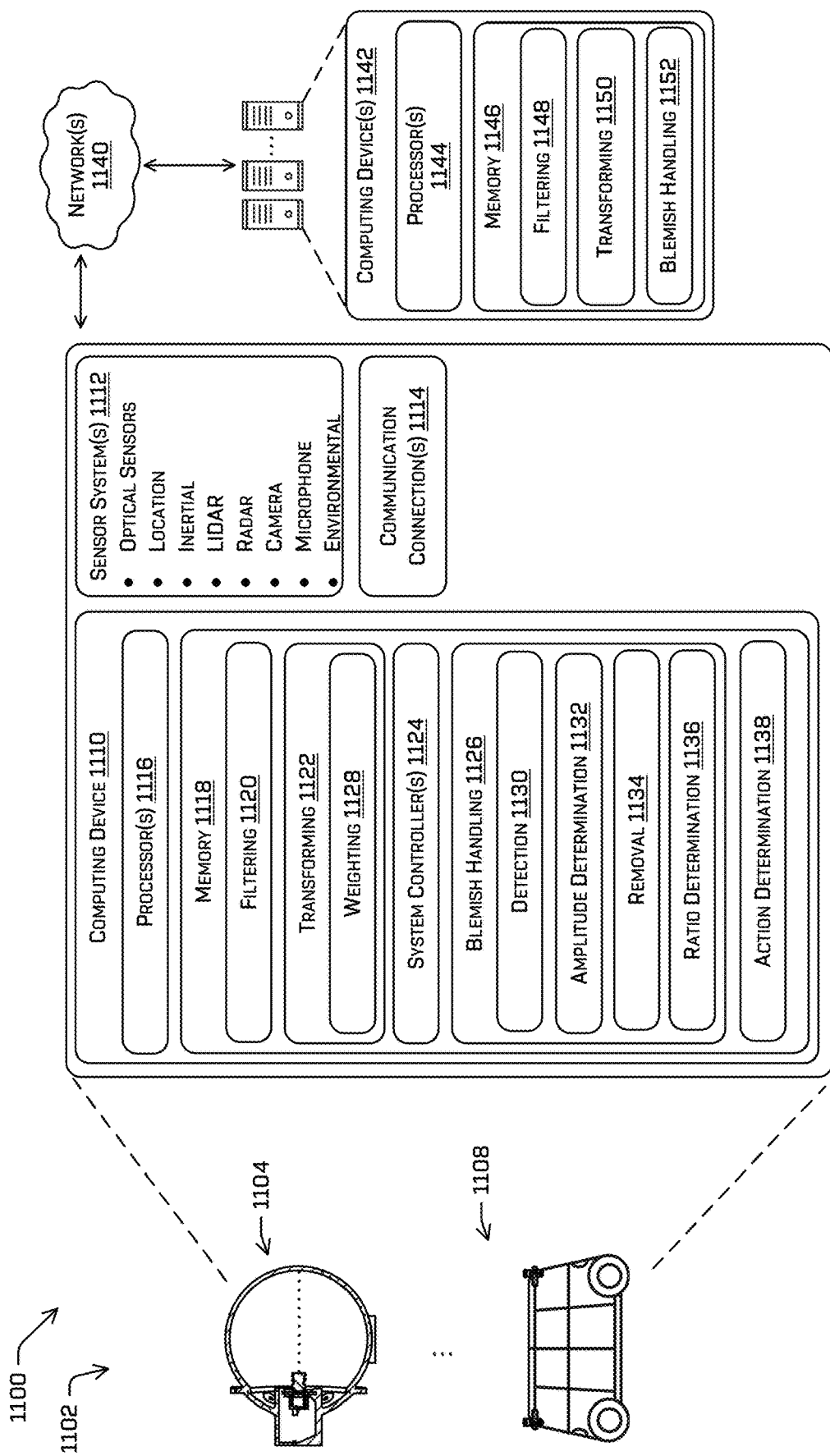
FIG. 11 is a block diagram of an example system for implementing the techniques of FIGS. 4-10B.

FIG. 11 illustrates a block diagram of an example system 1100 for implementing the techniques described herein. In at least one example, the system 1100 can include a sensor platform 1102 and control system or a vehicle, which can be the same vehicle and sensors as the vehicle 100 and optical sensors described above with reference to FIGS. 1&2.

The sensor platform 1102 can include a test enclosure 1104 or a vehicle 1108 and may include a computing device 1110, one or more sensor systems 1112, for example, one or more optical sensors, and one or more communication connections 1114.

The computing device 1110 can include one or more processors 1116 and memory 1118 communicatively coupled with the one or more processors 1116. In the illustrated example, the sensor platform 1102 may be a test enclosure or an autonomous vehicle; however, the autonomous vehicle can be any other type of vehicle autonomous or not. Moreover, and as described herein, the techniques described herein are not limited to vehicles and test mounts, but to any device that has a sensor and access to semantic segmentation information about an environment of the sensor (or otherwise able to generate such information). In the illustrated example, the memory 1118 of the computing device 1110 stores a filtering component 1120, a transforming component 1122, one or more system controllers 1124, and a blemish handling component 1126. As also illustrated, the transforming component 1122 can include a weighting component 1128, and the blemish handling component 1126 can include a detection component 1130, an amplitude determination component 1132, a removal component 1134, and a ratio determination component 1136. The memory 1118 can also store an action determination component 1138. Though depicted in FIG. 11 as residing in memory 1118 for illustrative purposes, it is contemplated that several of the features, including the filtering component 1120, the transforming component 1122, the blemish handling component 1126, the action determination component 1138 and/or other components may additionally, or alternatively, be accessible to the sensor platform 1102 (e.g., stored remotely).

In some instances, aspects of some or all of the components discussed herein may include any models, algorithms, and/or machine learning algorithms. For example, in some instances, the components in the memory 1118 (and memory 1146, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

In at least one example, the sensor system(s) 1112 can include optical sensors such as cameras (e.g., RGB, IR, intensity, depth, time of flight, etc.), LIDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), microphones, wheel encoders, environment sensors (e.g., temperature sensors, humidity sensors, light sensors, pressure sensors, etc.), etc. The sensor system(s) 1112 can include multiple instances of each of these or other types of sensors. For instance, the camera sensors can include multiple cameras disposed at various locations about the exterior and/or interior of the sensor platform 1102. The sensor system(s) 1112 can provide input to the computing device 1110. Additionally, or alternatively, the sensor system(s) 1112 can send sensor data, via one or more networks 1140, to one or more remote computing devices at a particular frequency, after a lapse of a predetermined period of time, in near real-time, etc.

In some examples, the sensor system(s) 1112 can be active sensor systems, e.g., that include controls for actively adjusting parameters thereof. For example, some cameras may have adjustable shutter speed or exposure time. Similarly, time-of-flight sensors, LiDAR sensors, radar sensors, and the like may have actively adjustable intensity and/or gain attributes. In some implementations, the semantic segmentation information may be further used to adjust one or more settings of the sensor. For example, when the semantic segmentation information identifies a certain class of type of object in the environment of a sensor, the sensor can be adjusted to optimize sensing of that object. For instance, when certain objects that are expected to have an expected color or brightness are identified from the semantic segmentation information, the intensity of emitted light can be adjusted to optimize sensing.

The processor(s) 1116 of the sensor platform 1102 can be any suitable processor capable of executing instructions to process data and perform operations as described herein. By way of example and not limitation, the processor(s) 1116 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1118 is an example of non-transitory computer-readable media. The memory 1118 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 11 is illustrated as a distributed system, in alternative examples, components of the sensor platform 1102 can be associated with remote computing devices accessible via the network(s) 1140. For example, the sensor platform 1102 can send sensor data to one or more computing device(s) 1142, via the network(s) 1140. In some examples, the sensor platform 1102 can send raw sensor data to the computing device(s) 1142. In other examples, the sensor platform 1102 can send processed sensor data and/or representations of sensor data to the computing device(s) 1142. In some examples, the sensor platform 1102 can send sensor data to the computing device(s) 1142 at a particular frequency, after a lapse of a predetermined period of time, in near real-time, etc. In some cases, the sensor platform 1102 can send sensor data (raw or processed) to the computing device(s) 1142 as one or more log files.

The computing device(s) 1142 can receive the sensor data (raw or processed) and can perform calibration operations on the data. In at least one example, the computing device(s) 1142 can include one or more processors 1144 and memory 1146 communicatively coupled with the processor(s) 1144. In the illustrated example, the memory 1146 of the computing device(s) 1142 stores a filtering component 1148, a transforming component 1150, and/or a blemish handling component 1152. The filtering component 1148 can include functionality to perform operations similar to those discussed above in the context of the filtering component 1120, the transforming component 1150 can include functionality to perform operations similar to those discussed above in the context of the transforming component 1122, and the blemish handling component 1152 may correspond to the blemish handling component 1126. In some instances, the processor(s) 1144 and the memory 1146 can include functionality and/or structure similar to that discussed above with respect to the processor(s) 1116 and the memory 1118.

Illustrative Test Enclosure and Techniques

Figure 12A:
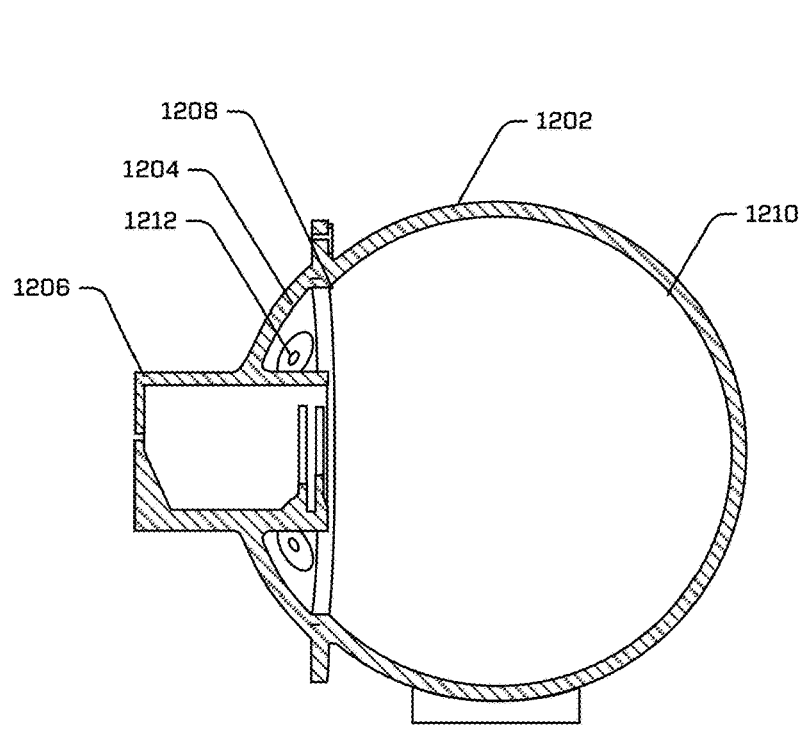
FIGS. 12A-12B show cutaway views of an illustrative test enclosure, in accordance with examples of the disclosure.

FIGS. 12A-15B show views of an illustrative test enclosure. For example, FIG. 12A shows a cutaway view of a test enclosure 1200. In examples, the test enclosure 1200 may include a first body portion 1202 coupled to a second body portion 1204 and a mounting structure 1206. In examples, the first body portion 1202 is configured to join to the second body portion 1204 at joint 1208. In examples, the first body portion 1202 is configured to have a concave region defined by a concave surface 1210. In certain examples, the concave surface evenly distributes light. For example, the concave surface may comprise a Lambertian surface.

FIG. 12A also shows illumination source 1212. In examples, the illumination source 1212 may include an LED light source and may include a filter or diffuser to control the distribution of light emitted from the illumination source 1212.

FIG. 12A shows the test enclosure 1200 with an optical imaging device 1216. In this example, the optical imaging device 1216 includes a lens 1218 having a focal axis 1220 and a lens field of view 1222. In this example, the maximum field of view of the lens 1218 is shown as line 1224. In certain examples, when the optical imaging device 1216 is mounted to the mounting structure 1206 and seated in the test enclosure 1200, the focal axis 1220 is directed at the concave surface 1210 such that the joint 1208 between the first body portion 1202 and the second body portion 1204 is outside the maximum field of view 1222 as shown by lines 1224. In this example, the joint 1208 is outside the shown field of view 1222 since it is located to the left of lines 1224 in FIG. 12B.

Figure 13A:
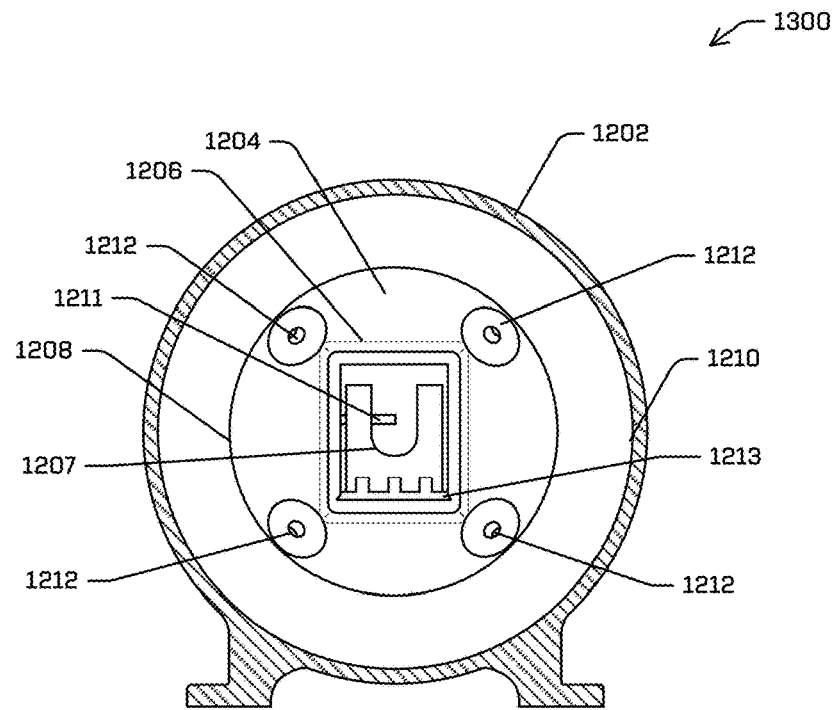
FIGS. 13A-13B show cutaway views of an illustrative test enclosure, in accordance with examples of the disclosure.
Figure 13B:
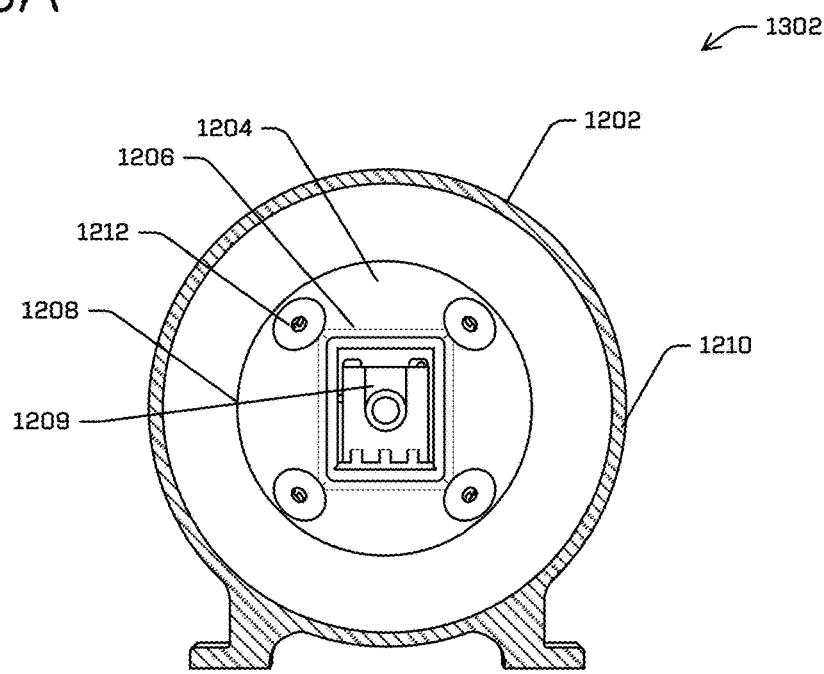

FIGS. 13A and 13B show cutaway views 1300 and 1302 of the test enclosure 1200 of FIG. 12A at approximately an orthogonal angle to the cutaway view depicted in FIG. 12A. In certain examples, the test enclosure 1200 may include the first body portion 1202 coupled to the second body portion 1204 and a mounting structure 1206. In this example, multiple illumination sources 1212 are disposed around the mounting structure 1206 and the second body portion 1204. In this example, the location of the illuminating sources 1212 may provide a more uniform distribution of light on the concave surface 1210.

In some examples, the mounting structure 1206 includes a sliding member 1207 (e.g., a slide), a receiving member 1209 (e.g., a slide receiver), a sensor mount 1211, and an indexing member 1213 (e.g., an index). The receiving member 1209 may be coupled to the second body portion 1204 and configured to receive the sliding member 1207. The sensor mount 1211 may be fixedly coupled to the sliding member 1207 and configured to couple to the optical imaging device 1216. The indexing member 1213 may be coupled to the receiving member 1209 or the sliding member 1207 and configured to selectively hold the sliding member 1207 in a fixed position relative to the receiving member 1209.

Figure 12B:
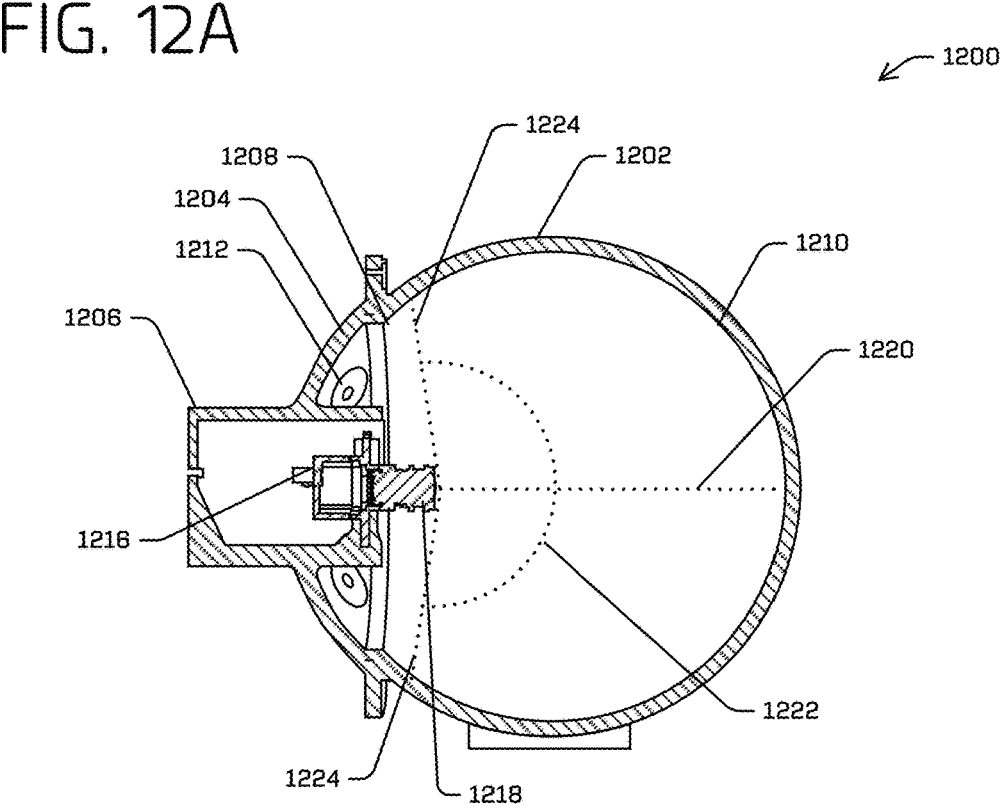
Figure 14A:
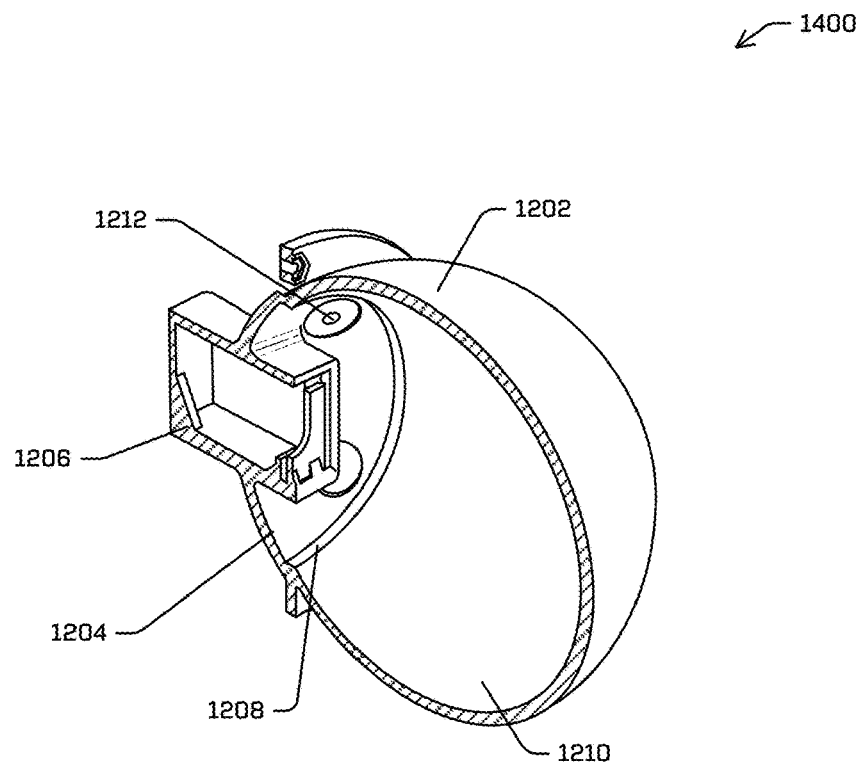
FIGS. 14A-14B show cutaway views of an illustrative test enclosure, in accordance with examples of the disclosure.
Figure 14B:
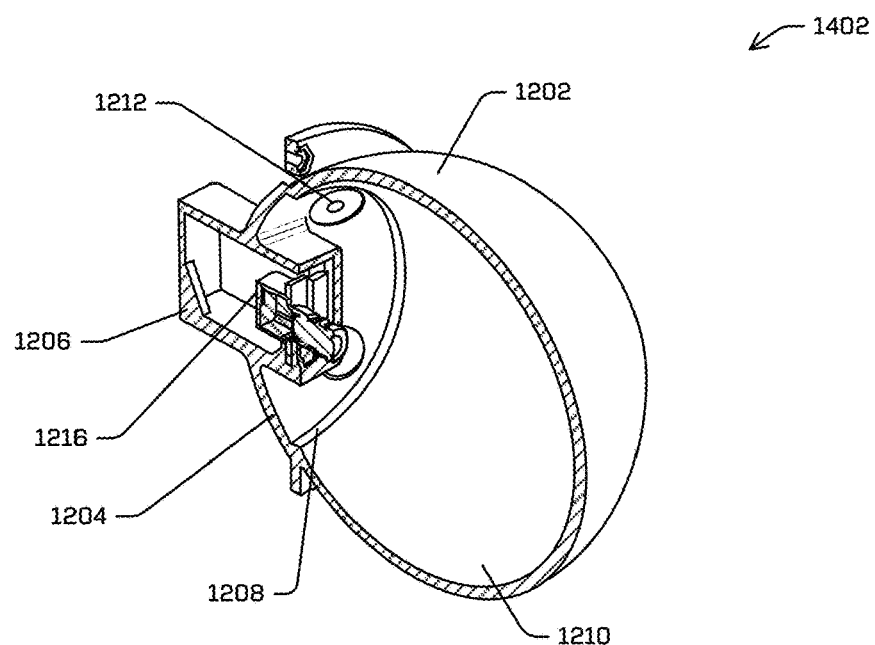

FIGS. 14A and 14B show cutaway views 1400 and 1402 of the test enclosure 1200 of FIG. 12A at an angle to the cutaway view depicted in FIG. 12A. In certain examples, the test enclosure 1200 may include the first body portion 1202 coupled to the second body portion 1204 and a mounting structure 1206. In this example, mounting structure 1206 may include a sliding feature the sliding member 1207 that allows an optical imaging device 1216 to be mounted to the mounting structure 1206 outside of the test enclosure 1200 and repeatably slide into the test enclosure 1200 and lock in the desired orientation, for example, as shown in FIG. 12B.

Figure 15A:
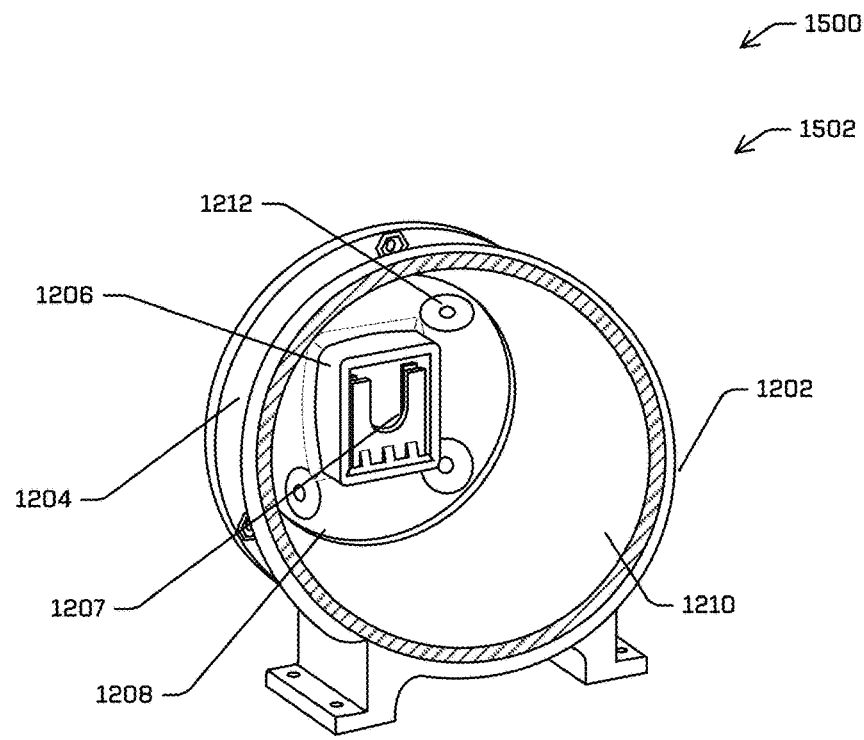
FIGS. 15A-15B show cutaway views of an illustrative test enclosure, in accordance with examples of the disclosure.
Figure 15B:
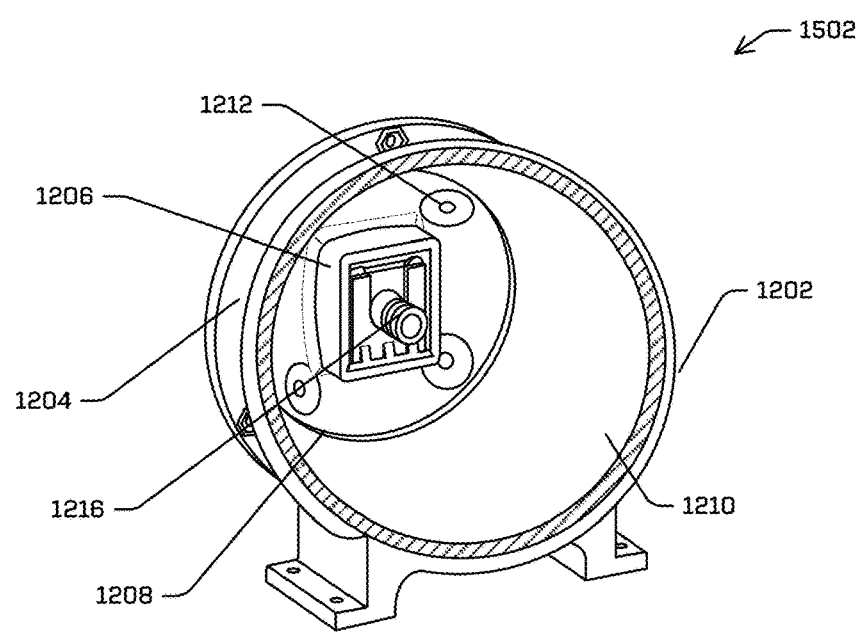

FIGS. 15A and 15B show cutaway views 1500 and 1502 of the test enclosure 1200 of FIG. 12A at an oblique angle to the cutaway view depicted in FIG. 12A. In certain examples, the test enclosure 1200 may include the first body portion 1202 coupled to the second body portion 1204 and a mounting structure 1206. In this example, the mounting structure 1206 includes the sliding member 1207 and the mounting structure 1206 may be disposed in to the cavity defined by the concave surface 1210 far enough to keep the joint 1208 out of the field of view of the optical imaging device 1216.

Figure 16:
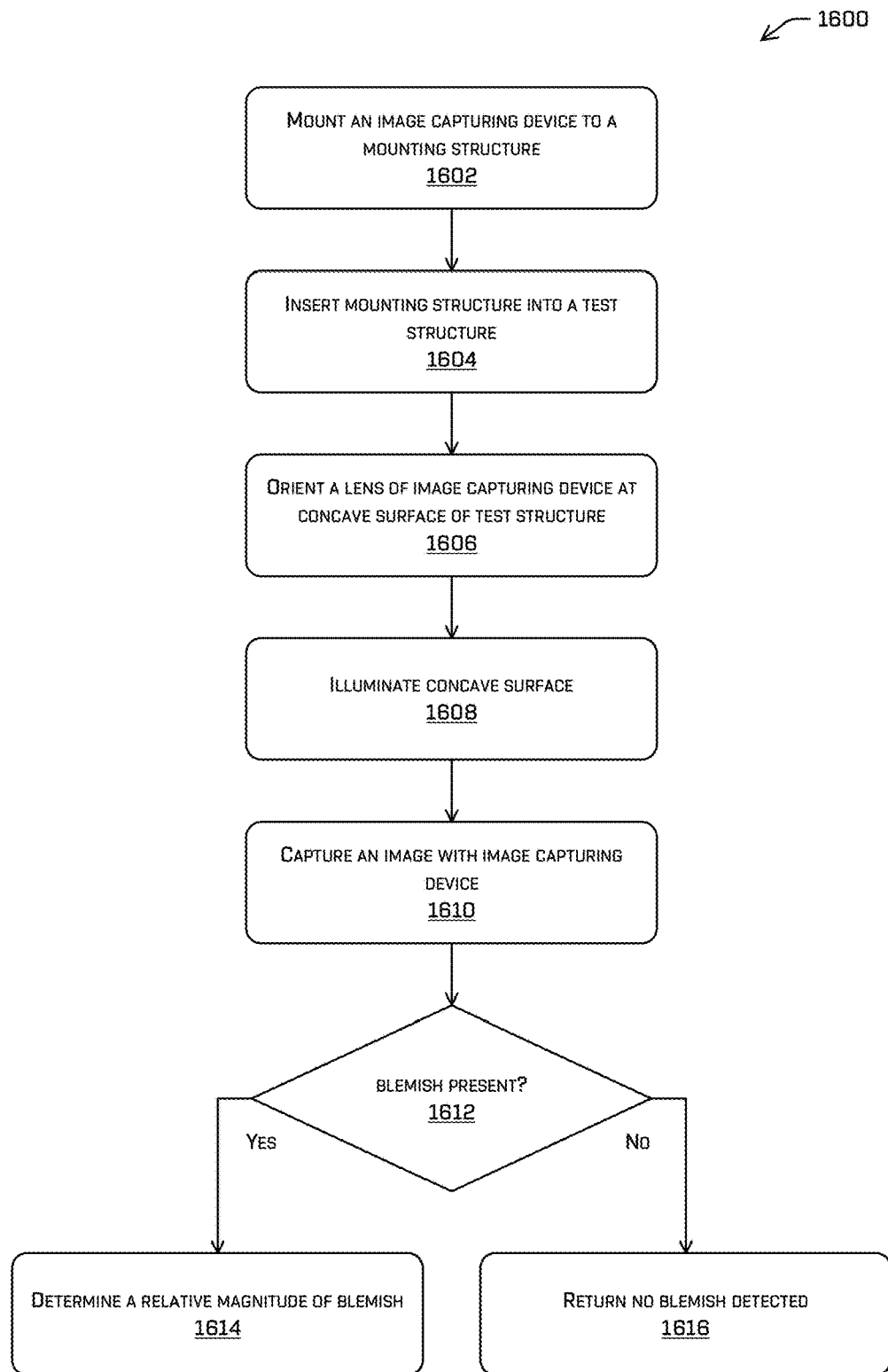
FIG. 16 is a flow chart showing an illustrative example method and process involving blemish detection and characterization with a test enclosure, in accordance with examples of the disclosure.

FIG. 16 is a flow chart showing an illustrative example method and process involving blemish detection while using a test enclosure. FIGS. 11-15 show illustrative examples of a test enclosure suitable for use with example method and process.

The technique illustrated in FIG. 16 is described with reference to one or more of the sensors, test enclosures, and/or systems shown in FIGS. 1-15 for convenience and ease of understanding. However, the techniques and processes illustrated in FIG. 16 is not limited to being performed using the sensors, test enclosures, and/or systems shown in FIGS. 1-15, and may be implemented using any of the other sensors, test enclosures, and/or systems described in this application, as well sensors, test enclosures, and/or systems other than those described herein. Moreover, the sensors, test enclosures, and/or systems described herein are not limited to performing the methods and processes illustrated in FIG. 16.

FIG. 16 depicts an example process 1600 of blemish detection and characterization in an image captured by an optical sensor located in a test enclosure. At operation 1602, an image capturing device is mounted to a mounting structure. For example, the mounting structure may receive the image capturing device outside of the test enclosure.

At operation 1604, the mounting structure with the image capturing device may be inserted into the test structure/test enclosure. For example, the mounting structure may be configured to slide into a receiving portion of the test enclosure and secure the image capturing device relative to the test enclosure.

At operation 1606, the lens of the image capture device may be oriented towards the concave surface of the test enclosure. For example, the lens may orientated such that any joint between portions of the test enclosure are outside of a field of view of the lens.

At operation 1608, the concave surface is illuminated. In certain examples, an illumination device may be disposed outside of the field of view of the lens and may be directed towards the concave surface. In certain examples, the light from the illumination device bounces around the concave surface creating a uniform distribution of light. In this example, the uniform distribution of light on the concave surface allows the image capture device to capture an evenly lit image. In certain examples, and evenly lit image allows a blemish detection system to more readily and accurately detect and characterize a blemish.

At operation 1610, the image capture device captures a image of the concave surface, for example, an evenly illuminated concave surface.

At operation 1612, the captured image is evaluated to determine if a blemish on the image is present. In certain examples, a blemish detection system as discussed with reference to FIGS. 1-4, may be used to determine whether a blemish is present. If a blemish is detected, the process may continue on to operation 1614.

At operation 1614, the identified blemish may be evaluated to determine a relative magnitude of the blemish relative to other portions of image. In certain examples, a blemish detection system as discussed with reference to FIGS. 1-4, may be used to determine a relative magnitude of the blemish, for example, determine a blemish ratio.

Returning to operation 1612, if a blemish is not found, in certain examples, the process may return and indication that a blemish was not detected on the image at operation 1616. In some examples, regardless of whether a blemish is explicitly detected at operation 1612, the process may continue on to operation 1614 and continue the analysis.

Example Clauses

Any of the example clauses in this section may be used with any other of the example clauses and/or any of the other examples or embodiments described herein.

A: A system comprising: one or more processors; and non-transitory computer-readable media storing one or more instructions that, when executed, cause the one or more processors to perform acts comprising: receiving, from an optical imaging device comprising a sensor with a transparent protective layer, an image; generating, based at least in part on the image, a transformation, and a bandpass filter, a processed image; determining a relative magnitude of an intensity of a portion of the processed image relative to another area of the image; determining, based at least in part on the relative magnitude meeting or exceeding a threshold, a blemish associated with the optical imaging device; and performing an action based at least in part on determining the blemish.

B: The system of paragraph A, wherein generating the processed image comprises: applying a Fourier transform to the image to determine a transformed image; applying the bandpass filter to the transformed image to create a filtered image; and applying an inverse Fourier transform to the filtered image to generate the processed image.

C: The system paragraphs A or B, wherein the determining the relative magnitude of the blemish comprises: determining, as a first value, an intensity value associated with a pixel of the image; determining, as a second value, an intensity value of an associated pixel of the processed image; and determining a ratio of the second value to a sum of the first and second values.

D: The system of any one of paragraphs A-C, wherein the acts further comprise generating a masked image, the masked image comprising portions of the image having an associated ratio is less than or equal to the threshold.

E: The system of any one of paragraphs A-D, wherein the bandpass filter is determined based at least in part on: determining a high bandpass filter based at least in part on a first feature size, and a first filter algorithm; and determining a low bandpass filter based at least in part on a second feature size, and a second filter algorithm.

F: The system of any one of paragraphs A-E, wherein the action comprises one or more of: provide a masked image representative of the blemish to a vehicle such that the vehicle downweighs data associated with images collected from the optical sensor corresponding to the blemish; identify the location of the blemish; clean the imaging device; rework the imaging device; remove the imaging device from a work flow; divert the imaging device to a first installation location and/or away from a second installation location; or divert the imaging device to a rework que.

G: A method comprising: receiving, from an optical imaging device comprising a sensor with a transparent protective layer, an image; generating, based at least in part on the image, a transformation, and a bandpass filter, a processed image; determining a relative magnitude of an intensity of a portion of the processed image relative to another area of the image; determining, based at least in part on the relative magnitude meeting or exceeding a threshold, a blemish associated with the optical imaging device; generating a masked image, the masked image comprising portions of the image having an associated ratio less than or equal to the threshold; and providing the masked image to a vehicle such that the vehicle downweighs data associated with images collected from the optical sensor corresponding to the blemish.

H: The method of paragraph G, wherein generating the processed image comprises: applying a Fourier transform to the image to determine a transformed image; applying the bandpass filter to the transformed image to create a filtered image; and applying an inverse Fourier transform to the filtered image to generate the processed image.

I: The method of paragraph G or H, further comprising: determining a region of the image corresponding to a field of view of the imaging device; generating a padded image based at least in part on assigning a pixel value of a first pixel with a pixel value of a second pixel, the pixel value corresponding to a third pixel at an edge of the region, the second pixel being adjacent to the first pixel outside of the region; and generating the processed image based at least in part on the padded image.

J: The method of any one of paragraphs G-I, wherein the relative magnitude of the blemish comprises a ratio between a first amount of light energy blocked by the blemish on the optical imaging device from reaching a portion of an imaging sensor of the optical imaging device and a second amount of light energy expected at the portion of the imaging sensor without the blemish.

K: The method of any one of paragraphs G-J, wherein the determining the relative magnitude of the blemish comprises: determining, as a first value, an intensity value associated with a pixel of the image; determining, as a second value, an intensity value of an associated pixel of the processed image; and determining a ratio of the second value to a sum of the first and second values.

L: The method of any one of paragraphs G-K, the generating the processed image comprising: generating a transformed masked image based at least on applying a Fourier transformation to the masked image; generating a shifted image based at least on applying a Fourier shift operation to the transformed masked image; generating a filtered image based at least on applying the bandpass filter to the shifted image; generating an inverse Fourier shifted image based at least on applying an inverse Fourier shift operation to the filtered image; and generating the transformed image based at least on applying an inverse Fourier transformation to the inverse Fourier shifted image.

M: The method of any one of paragraphs G-L, further comprising: determining that a focal length of a lens associated with capturing the image is below a focal length threshold; and applying an area mask to the image to exclude a first region of the image.

N: The method of any one of paragraphs G-M, wherein the bandpass filter is determined based at least in part on: determining a high bandpass filter based at least in part on a first feature size, and a first filter algorithm; determining a low bandpass filter based at least in part on a second feature size, and a second filter algorithm; and applying the high bandpass filter and the low bandpass filter to the image.

O: The method of any one of paragraphs G-N, further comprising: determining that the relative magnitude exceeds a threshold; and generating, when the relative magnitude exceeds the threshold, a notification that the blemish on the optical imaging device exceeds the threshold and should be evaluated for corrective measures.

P: A non-transitory computer-readable media storing one or more instructions that, when executed, cause one or more processors to perform acts comprising: receiving, from an optical imaging device comprising a sensor with a transparent protective layer, an image; generating, based at least in part on the image, a transformation, and a bandpass filter, a processed image; determining a relative magnitude of an intensity of a portion of the processed image relative to another area of the image; determining, based at least in part on the relative magnitude meeting or exceeding a threshold, a blemish associated with the optical imaging device; and performing an action based at least in part on determining the blemish.

Q: The non-transitory computer-readable media of paragraphs P, wherein generating the processed image comprises: applying a Fourier transform to the image to determine a transformed image; applying the bandpass filter to the transformed image to create a filtered image; and applying an inverse Fourier transform to the filtered image to generate the processed image.

R: The non-transitory computer-readable media of paragraph P or Q, the determining the relative magnitude of the blemish comprises: determining, as a first value, an intensity value associated with a pixel of the image; determining, as a second value, an intensity value of an associated pixel of the processed image; and determining a ratio of the second value to a sum of the first and second values.

S: The non-transitory computer-readable media of any one of paragraphs P-R, the generating the processed image comprising: generating a transformed masked image based at least on applying a Fourier transformation to the masked image; generating a shifted image based at least on applying a Fourier shift operation to the transformed masked image; generating a filtered image based at least on applying the bandpass filter to the shifted image; generating an inverse Fourier shifted image based at least on applying an inverse Fourier shift operation to the filtered image; and generating the transformed image based at least on applying an inverse Fourier transformation to the inverse Fourier shifted image.

T: The non-transitory computer-readable media of any one of paragraphs P-S, the acts further comprising: determining that a focal length of a lens associated with capturing the image is below a focal length threshold; and applying an area mask to the image to exclude a first region of the image.

U: The non-transitory computer-readable media of any one of paragraphs P-T, wherein the bandpass filter is determined based at least in part on: determining a high bandpass filter based at least in part on a first feature size, and a first filter algorithm; determining a low bandpass filter based at least in part on a second feature size, and a second filter algorithm, wherein the first filter algorithm and the second filter algorithm are one or more of a Gaussian-based, a Butterworth-based, or a Fourier transform-based filter; and applying the high bandpass filter and the low bandpass filter to the image.

V: A system comprising: a mounting structure configured to removably couple an optical imaging device in a fixed orientation relative to the system, the optical imaging device having a lens having an optical axis and a lens field of view oriented to focus light from a light source onto an optical sensor; a first body having a concave surface defined by a substantially spherical sector configured to evenly disburse light reflected on the concave surface, the spherical sector being greater than a hemisphere; a second body coupled to the mounting structure and coupled to the first body at a first interface, wherein the mounting structure and the second body are configured to orient an optical axis of the lens towards the concave surface and locate the lens relative to the concave surface where the first interface is outside of the lens field of view; and a light source disposed in the second body and directed towards the concave surface of the of the first body.

W: The system of paragraph V, wherein the first body and the second body collectively form a substantially spherical concave surface defining a substantially spherical cavity.

X: The system of paragraph V or W, wherein the first body and the second body are joined at a seam such that the optical imaging device is unable to image the seam.

Y: The system of any one of paragraphs V-X, wherein the mounting structure comprises: a sliding member; a receiving member coupled to the second body and configured to receive the sliding member; a sensor mount fixedly coupled to the sliding member and configured to couple to the optical imaging device; and an indexing member coupled to the receiving member or sliding member and configured to selectively hold the sliding member in a fixed position relative to the receiving member.

Z: The system of any one of paragraphs V-Y, wherein the concave surface comprises a Lambertian surface.

AA The system of any one of paragraphs V-Z, wherein the light source comprises a light emitting diode configured to emit light through a diffuser configured to provide a uniform lighting pattern on the concave surface.

BB: The system of any one of paragraphs V-AA, wherein the light source is oriented relative to the lens such that light emitted from the light source is prevented from entering the lens unless reflected off the concave surface.

CC: A method comprising: mounting to a mounting structure an image capturing device comprising an optical sensor and lens having an optical axis and a lens field of view; inserting the mounting structure into a test structure, the test structure comprising a first body have a concave surface and a second body coupled to the first body, the first body and the second body defining a cavity, the first body defining a spherical sector greater than a hemisphere, the first body and the second body being joined at a seam; orienting and optical axis of the lens towards the concave surface such that the seam is outside the lens field of view; illuminating the concave surface; and capturing an image with the image capturing device.

DD: The method of paragraph CC, wherein the orienting the lens comprises securing the mounting structure to the test structure with an indexing member directing the optical axis of the lens at a center of the concave surface of the first body where the seam is outside the lens field of view.

EE: The method of paragraph CC or DD, wherein the concave surface comprises a Lambertian surface.

FF: The method of any one of paragraphs CC-EE, wherein the illuminating the concave surface comprises passing light from a light emitting diode through a diffuser.

GG: The method of any one of paragraphs CC-FF, further comprising: determining a blemish is present on the captured image based at least part on applying one or more of a transformation or a filter to the captured image.

HH: The method of any one of paragraphs CC-GG, further comprising: determining a blemish ratio of the blemish based at least in part on a relative magnitude of the blemish relative to another area of the image.

II: A system comprising: a mounting structure configured to removably couple an optical imaging device; a first body having a concave surface defined by a substantially spherical sector configured to evenly disburse light reflected on the concave surface, the spherical sector being greater than a hemisphere; a second body coupled to the mounting structure and coupled to the first body at a first interface, wherein the mounting structure and the second body are configured to orient an optical axis of a lens of the optical imaging device towards the concave surface and locate the lens relative to the concave surface where the first interface is outside of a lens field of view of the lens, wherein the mounting structure configured to removably couple the optical imaging device in a fixed orientation relative to the first body and the second body; and a light source disposed in the second body and directed towards the concave surface of the of the first body.

JJ: The system of paragraph II, wherein the first body and the second body are joined at a seam such that the optical imaging device is unable to image the seam.

KK: The system of paragraph II or JJ, wherein the first body and the second body collectively form a substantially spherical concave surface defining a substantially spherical cavity.

LL: The system of any one of paragraphs II-KK, wherein the mounting structure comprises: a sliding member; a receiving member coupled to the second body and configured to receive the sliding member; a sensor mount fixedly coupled to the sliding member and configured to couple to the optical imaging device; and an indexing member coupled to the receiving member or sliding member and configured to selectively hold the sliding member in a fixed position relative to the receiving member.

MM: The system of any one of paragraphs II-LL, wherein the concave surface comprises a Lambertian surface.

NN: The system of any one of paragraphs II-MM, wherein the light source comprises a light emitting diode configured to emit light through a diffuser configured to provide a uniform lighting pattern on the concave surface.

OO: The system of any one of paragraphs II-NN, wherein the light source is oriented relative to the lens such that light emitted from the light source is prevented from entering the lens unless reflected off the concave surface.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a mounting structure configured to removably couple an optical imaging device in a fixed orientation relative to the system, the optical imaging device having a lens having an optical axis and a lens field of view oriented to focus light from a light source onto an optical sensor;
   a first body having a concave surface defined by a substantially spherical sector configured to evenly disburse light reflected on the concave surface, the spherical sector being greater than a hemisphere;
   a second body coupled to the mounting structure and coupled to the first body at a seam, wherein the mounting structure and the second body are configured to orient an optical axis of the lens towards the concave surface and locate the lens relative to the concave surface where the seam is outside of the lens field of view; and
   a light source disposed in the second body and directed towards the concave surface of the first body.

2. The system of claim 1, wherein the first body and the second body collectively form a substantially spherical concave surface defining a substantially spherical cavity.

3. The system of claim 1, wherein the mounting structure comprises:
   a slide;
   a slide receiver coupled to the second body and configured to receive the slide;
   a sensor mount fixedly coupled to the slide and configured to couple to the optical imaging device; and
   an index coupled to the slide receiver or slide and configured to selectively hold the slide in a fixed position relative to the slide receiver.

4. The system of claim 1, wherein the concave surface comprises a Lambertian surface.

5. The system of claim 1, wherein the light source comprises a light emitting diode configured to emit light through a diffuser configured to provide a uniform lighting pattern on the concave surface.

6. The system of claim 1, wherein the light source is oriented relative to the lens such that light emitted from the light source is prevented from entering the lens unless reflected off the concave surface.

7. The system of claim 2, wherein the first body and the second body are joined at the seam such that the optical imaging device is unable to image the seam.

8. A method comprising:
   mounting to a mounting structure an image capturing device comprising an optical sensor and lens having an optical axis and a lens field of view;
   inserting the mounting structure into a test structure, the test structure comprising a first body having a concave surface and a second body coupled to the first body, the first body and the second body defining a cavity, the first body defining a spherical sector greater than a hemisphere, the first body and the second body being joined at a seam;
   orienting the optical axis of the lens towards the concave surface such that the seam is outside the lens field of view;
   illuminating the concave surface; and
   capturing an image with the image capturing device.

9. The method of claim 8, wherein the orienting the optical axis lens comprises securing the mounting structure to the test structure with an indexing member directing the optical axis of the lens at a center of the concave surface of the first body where the seam is outside the lens field of view.

10. The method of claim 8, wherein the concave surface comprises a Lambertian surface.

11. The method of claim 8, wherein the illuminating the concave surface comprises passing light from a light emitting diode through a diffuser.

12. The method of claim 8, further comprising:
   determining a blemish is present on the captured image based at least part on applying one or more of a transformation or a filter to the captured image.

13. The method of claim 12, further comprising:
determining a blemish ratio of the blemish based at least in part on a relative magnitude of the blemish relative to another area of the image.

14. A system comprising:
a mounting structure configured to removably couple an optical imaging device;
a first body having a concave surface defined by a substantially spherical sector configured to evenly disburse light reflected on the concave surface, the spherical sector being greater than a hemisphere;
a second body coupled to the mounting structure and coupled to the first body at a seam, wherein the mounting structure and the second body are configured to orient an optical axis of a lens of the optical imaging device towards the concave surface and locate the lens relative to the concave surface where the seam is outside of a lens field of view of the lens, wherein the mounting structure configured to removably couple the optical imaging device in a fixed orientation relative to the first body and the second body; and
a light source disposed in the second body and directed towards the concave surface of the first body.

15. The system of claim 14, wherein the first body and second body are joined at the seam such that the optical imaging device is unable to image the seam.

16. The system of claim 14, wherein the first body and the second body collectively form a substantially spherical concave surface defining a substantially spherical cavity.

17. The system of claim 14, wherein the mounting structure comprises:
a slide;
a slide receiver coupled to the second body and configured to receive the slide;
a sensor mount fixedly coupled to the slide and configured to couple to the optical imaging device; and
an indexing member coupled to the slide receiver or slide and configured to selectively hold the slide in a fixed position relative to the slide receiver.

18. The system of claim 14, wherein the concave surface comprises a Lambertian surface.

19. The system of claim 14, wherein the light source comprises a light emitting diode configured to emit light through a diffuser configured to provide a uniform lighting pattern on the concave surface.

20. The system of claim 14, wherein the light source is oriented relative to the lens such that light emitted from the light source is prevented from entering the lens unless reflected off the concave surface.

* * * * *